United States Patent [19]
Ide et al.

[11] Patent Number: 5,603,574
[45] Date of Patent: Feb. 18, 1997

[54] FLUID DAMPENED SUPPORT HAVING VARIABLE STIFFNESS AND DAMPING

[75] Inventors: Russell D. Ide, Exeter; Fouad Y. Zeidan, Warwick, both of R.I.

[73] Assignee: KMC, Inc., W. Greenwich, R.I.

[21] Appl. No.: 654,015

[22] Filed: May 28, 1996

Related U.S. Application Data

[60] Continuation of Ser. No. 385,550, Feb. 8, 1995, abandoned, which is a division of Ser. No. 47,000, Apr. 16, 1993, Pat. No. 5,421,655, which is a continuation-in-part of Ser. No. 322,364, Oct. 13, 1994, Pat. No. 5,531,522, which is a continuation of Ser. No. 945,694, Sep. 16, 1992, abandoned, which is a continuation-in-part of Ser. No. 876,718, Apr. 24, 1992, abandoned, which is a continuation-in-part of Ser. No. 309,081, Feb. 8, 1989, Pat. No. 5,137,373, which is a continuation-in-part of Ser. No. 283,529, Oct. 25, 1988, Pat. No. 5,112,143, which is a continuation-in-part of Ser. No. 55,340, May 29, 1987, abandoned, said Ser. No. 385,550, is a continuation-in-part of Ser. No. 878,601, May 5, 1992, Pat. No. 5,489,155, which is a continuation-in-part of Ser. No. 685,148, Apr. 15, 1991, abandoned, which is a continuation-in-part of Ser. No. 309,081.

[51] Int. Cl.⁶ ......................................... F16C 17/03
[52] U.S. Cl. ............................. 384/117; 384/119
[58] Field of Search ............................. 384/117, 119, 384/122, 124, 312

[56] References Cited

U.S. PATENT DOCUMENTS

| | | |
|---|---|---|
| 1,664,878 | 4/1928 | Flintermann . |
| 2,424,028 | 7/1947 | Haeberlein . |
| 3,107,955 | 10/1963 | Trumpler . |
| 3,160,450 | 12/1964 | Gentiluomo . |
| 3,298,751 | 1/1967 | Elwell . |
| 3,456,992 | 7/1969 | Kulina . |
| 3,578,827 | 5/1971 | Smith . |
| 3,639,014 | 2/1972 | Sixsmith . |
| 3,863,996 | 2/1975 | Raimondi . |
| 3,994,541 | 11/1976 | Geary et al. . |
| 4,097,094 | 6/1978 | Gardner . |
| 4,213,661 | 7/1980 | Marmol . |
| 4,214,796 | 7/1980 | Monzel et al. . |
| 4,457,667 | 7/1984 | Seibert et al. . |
| 4,676,668 | 6/1987 | Ide . |

(List continued on next page.)

FOREIGN PATENT DOCUMENTS

| | | |
|---|---|---|
| 0206686 | 12/1986 | European Pat. Off. . |
| 1010959 | 6/1952 | France . |
| 2266042 | 10/1975 | France . |
| 2340470 | 2/1977 | France . |
| 53-56448 | 5/1978 | Japan . |
| 879116 | 10/1961 | United Kingdom . |

OTHER PUBLICATIONS

Article on Advance Multi–Squeeze Film Dampers for Rotor Vibration Control by Messrs. Heshmat and Walton (no date).

*Primary Examiner*—Lenard A. Footland
*Attorney, Agent, or Firm*—Michael D. Bednarek; Kilpatrick & Cody

[57] ABSTRACT

A fluid-dampened support for a bearing such as a tilt pad bearing or a rolling element bearing such as a ball bearing, needle bearing, roller bearing and the like. The fluid dampened support includes a network of closely spaced beams which act as structural springs which support the outer race of the roller bearing for movement in any direction. The spring rate or constant of these structural springs can be caused to change after a selected amount of deflection. The amount of deflection needed to cause the change in spring rate can be adjusted to suit the particular application. A liquid is provided in the spaces between the beams to dampen movement of the pads. The damping rate can be made to change with movement of the pads. The structure and space between the beams is designed so as to provide virtually any reasonable damping characteristics. By providing such damping characteristics, the bearings are able to limit or damp out the vibrations occurring when the supported member passes through natural frequencies before reaching operating speed. This allows use of the rolling element bearing in high speed equipment such as compressors and turbines.

12 Claims, 21 Drawing Sheets

U.S. PATENT DOCUMENTS

| | | |
|---|---|---|
| 4,709,545 | 12/1987 | Stevens et al. . |
| 4,867,655 | 9/1989 | Barbic et al. . |
| 4,872,767 | 10/1989 | Knapp . |
| 4,935,838 | 6/1990 | Barger et al. . |
| 4,973,221 | 11/1990 | Anderson et al. . |
| 4,981,415 | 1/1991 | Marmol . |
| 5,048,978 | 9/1991 | Singh . |
| 5,053,662 | 10/1991 | Richter . |
| 5,071,262 | 12/1991 | Monzel et al. . |

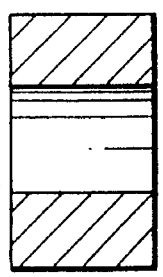 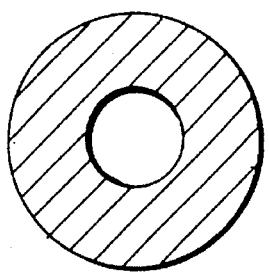 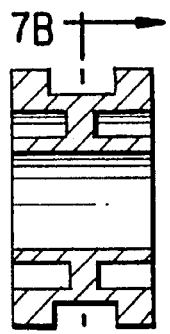 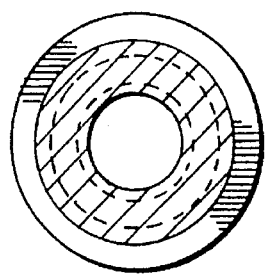
FIG. 5A  FIG. 5B  FIG. 7A  FIG. 7B
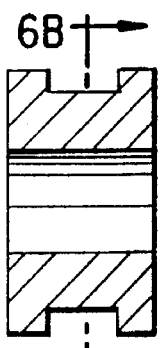 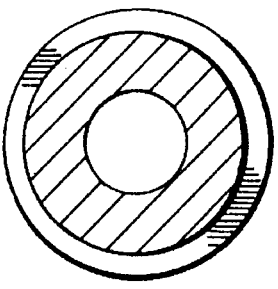 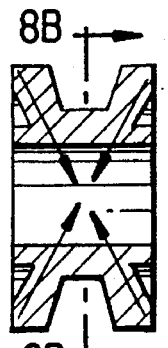 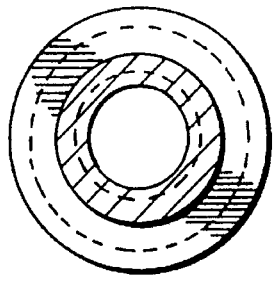
FIG. 6A  FIG. 6B  FIG. 8A  FIG. 8B
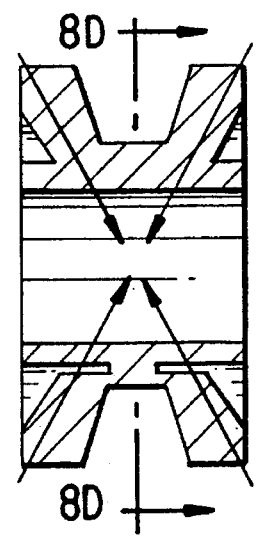 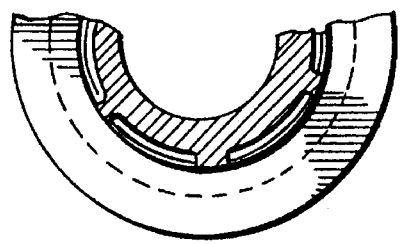
FIG. 8C  FIG. 8D

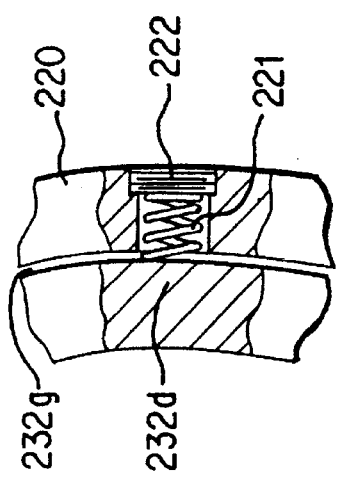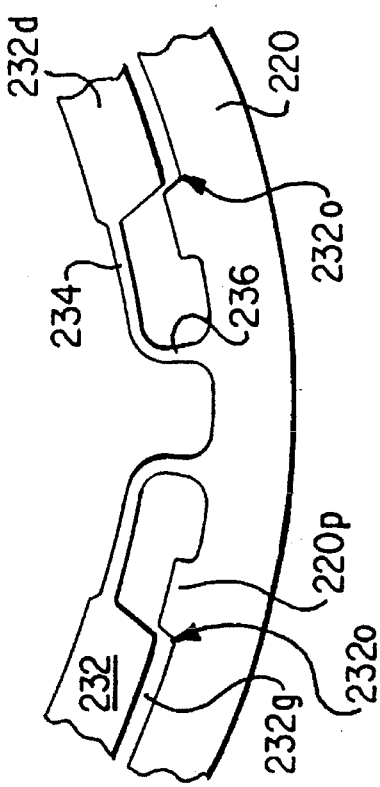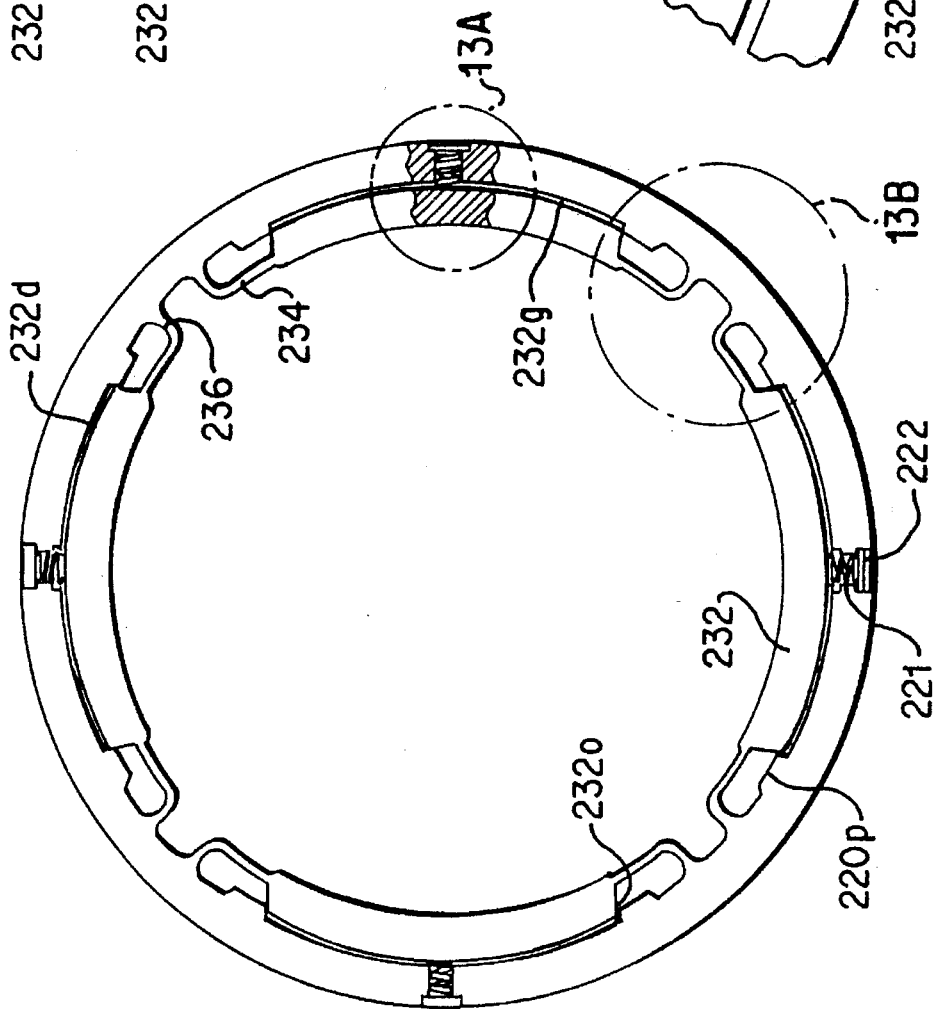

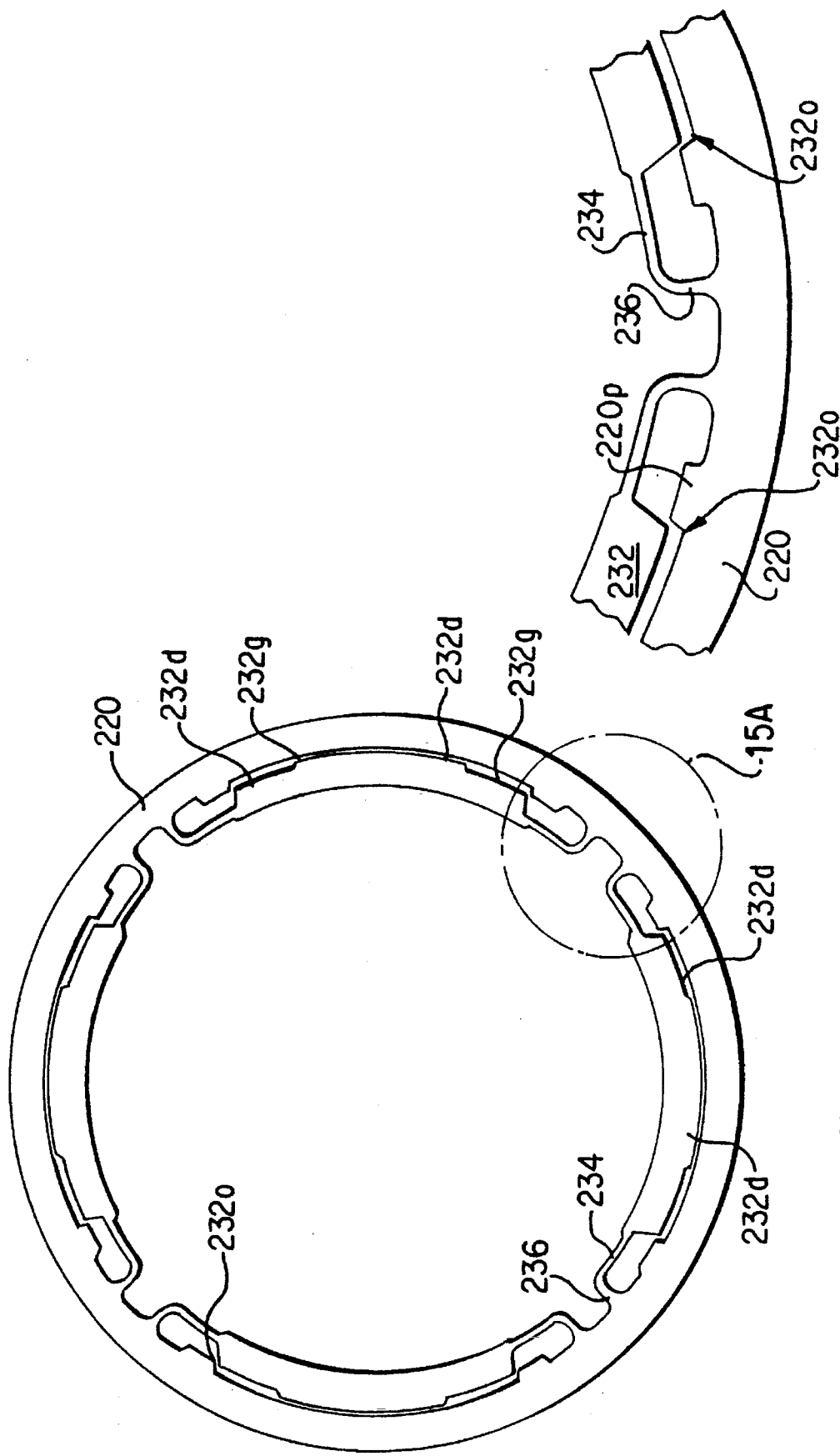

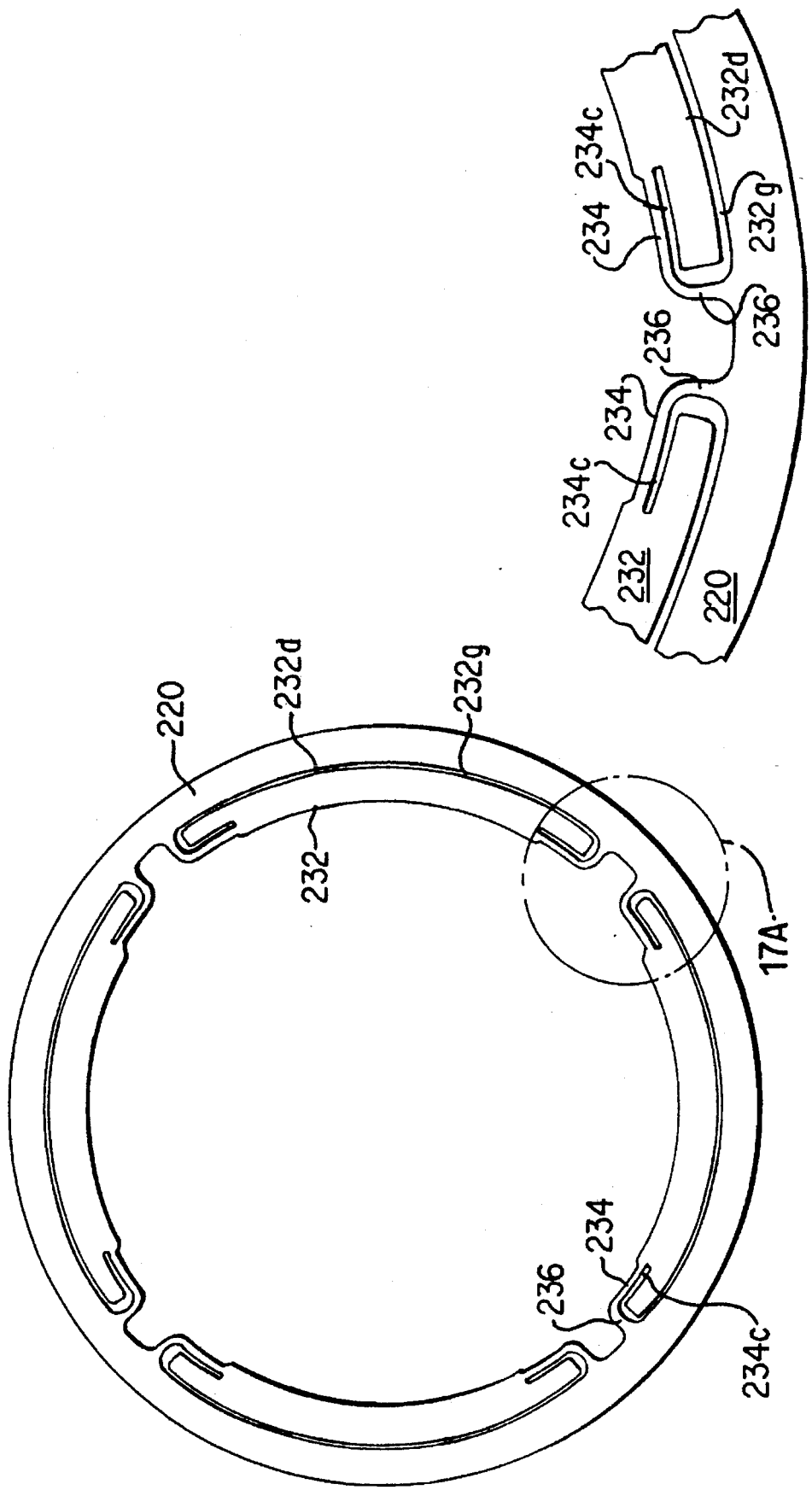

FLUID DAMPENED SUPPORT HAVING VARIABLE STIFFNESS AND DAMPING

This application is a continuation, of application Ser. No. 08/385,550 filed Feb. 8, 1995, abandoned, which is a divisional of U.S. application Ser. No. 08/047,000 filed Apr. 16, 1993, now U.S. Pat. No. 5,421,655 which was a continuation-in-part of U.S. application Ser. No. 08/322,364 filed Oct. 13, 1994 now U.S. Pat. No. 5,531,522, which was a continuation of U.S. application Ser. No. 07/945,694 filed Sep. 16, 1992 now abandoned, which was a continuation-in-part of U.S. application Ser. No. 07/876,718 filed Apr. 24, 1992 and now abandoned, which is a continuation-in-part of U.S. application Ser. No. 07/309,081 filed Feb. 8, 1989 now U.S. Pat. No. 5,137,373 which is a continuation-in-part of Ser. No. 07/283,529 filed Oct. 25, 1988 now U.S. Pat. No. 5,112,143 which is a continuation-in-part of Ser. No. 07/055,340 filed May 29, 1987, now abandoned.

Application Ser. No. 385,550 is also a continuation-in-part of U.S. application Ser. No. 07/878,601 filed May 5, 1992 now U.S. Pat. No. 5,489,155 which is a continuation-in-part of U.S. application Ser. No. 07/685,148 filed Apr. 15, 1991 now abandoned which is a continuation-in-part of the above-mentioned U.S. application Ser. No. 07/309,081.

FIELD OF THE INVENTION

The present invention relates to bearings and, more particularly, fluid dampened rolling element bearings and tilt pad bearings.

BACKGROUND OF THE INVENTION

Rolling element bearings such as ball, roller and needle bearings are used in almost every kind of machine and device with rotating parts. They are currently the most widely used bearing.

Rolling element bearings typically include four parts: an inner ring, an outer ring, the balls or rollers and a cage or separator for separating the balls from one another. The balls in ball bearings are normally made of high carbon chromium steel. The balls are heat treated to high strength and hardness and the surfaces are ground and polished. Cylindrical roller bearings are usually made of case hardened steel.

Rolling element bearings are made in a wide variety of types and sizes. Regardless of their size or shape, rolling element bearings operate on the same basic principle of allowing low friction rotation of one member relative to the other while maintaining solid metal-to-metal contact between the two elements.

For a rotating shaft, relative rotation between shaft and bearing is usually prevented by mounting the inner ring with a press fit and securing it with a nut threaded on the shaft. Excessive interference of metal must be avoided in press-fits, or the stretching of the inner ring may decrease the small but necessary internal looseness of the bearing.

Conventionally, rolling element bearings are mounted to a fixed housing so that because there is little radial play. Although the outer ring, when the shaft rotates, is mounted more loosely than the inner ring, rotational creep between the ring and the housing should be prevented.

Compared to other bearings such as conventional journal bearings, rolling element bearings offer a number of advantages. These include low starting friction; the ability to support loads inclined at any angle in the transverse plane; the ability to support thrust components of loads; and low maintenance cost. In addition the bearings are easily replaced when worn out and require less axial space than for journal bearings.

There are, however, certain disadvantages associated with conventional rolling element bearing assemblies. The cost is typically higher, more radial space is generally required than with journal bearings and more noise is generated by ball bearings, especially after wear. In addition, rolling element bearings are more subject to fatigue failure and are more easily damaged by foreign matter. All rolling element bearings have a limited life, typically less than 20,000 hours depending on the application. Another disadvantage associated with rolling element bearings is that they have very little damping capability because of the metal-to-metal contact between elements. Thus, rolling element bearings are typically less well suited to overload and shock conditions. This is a significant drawback in high speed turbo machinery.

High speed equipment such as the compressor turbine in a jet engine and aeroderivative applications such as steam turbines, gas turbines and compressors must pass through several natural frequencies before reaching operating speed. When a system operates at its natural frequency or resonance, the system/rotor vibration amplitudes become large. These vibrations can be destructive or even catastrophic if not adequately dampened. Bearings with adequate damping characteristics limit or damp out the vibrations to allow the equipment to safely pass through the critical speeds. Likewise, smaller vibrations due to unbalance can be dampened by the bearings damping characteristics.

As previously noted, rolling element bearings where metal-to-metal contact exists have very little damping capability. Accordingly, when rolling element bearings are used in jet engines or other high speed turbo machinery they must be supported in complex expensive multipart assemblies which use a squirrel cage centering spring. Examples of such constructions are shown in the following U.S. patents: U.S. Pat. No. 3,456,992 to Kulina disclosing fluid retained between sealing rings; U.S. Pat. No. 3,863,996 to Raimondi disclosing a fluid dampened journal bearing; U.S. Pat. No. 3,994,541 to Geary et al. disclosing a fluid dampened tilt pad bearing; U.S. Pat. No. 4,097,094 to Gardner disclosing a fluid dampened pad-type bearing and U.S. Pat. No. 4,213,661 to Marmol disclosing an O-ring type damper. Another form of damper was recently proposed by Messrs. Heshmat and Walton of Mechanical Technology Inc. These so-called multi-squeeze film dampers use a spiral foil to provide a spiral multi-film damper.

There are a number of disadvantages associated with known squeeze film damper bearings. Squeeze film dampers which use a squirrel cage centering spring typically occupy an axial space 2 to 3 times larger than the axial space available for the squeeze film land. Moreover, it is very difficult to install the centering spring and center the rotor within the squeeze film clearance. For this reason, the performance of the damper is often not consistent from one engine to another. The multi-piece design and precision required to assemble such an element is also very undesirable.

In process type compressors, elastomer O-rings are used as a centering spring element in addition to providing sealing at the damper ends. The elastomer rings are not reliable as spring elements and have a very narrow range of stiffness. They degrade with time and temperature. Centering the damper with the O-rings is also difficult because they tend to creep due to the static loading. O-rings are also not capable of taking any thrust load which is required in certain applications.

Another problem experienced in most conventional damper bearings is cavitation and air ingestion caused by negative pressure in the squeeze film cavity. Such cavitation is a primary cause of poor performance of conventional damper bearings.

Fluid film bearings, on the other hand, have significant damping capability from the fluid film. Of the available fluid film bearings, the so-called tilt-pad radial bearing is by far the most universally-prescribed design for machines requiring maximum rotordynamic stability because of its exceptional stability characteristics. Consequently, it has become the standard by which many other radial bearings are measured when seeking a highly stable bearing design. The tilt-pad bearing's popularity is evidenced by the large number of applications found in industry, both as original equipment, and as aftermarket replacements. Applications range from small high-speed machines such as turbochargers and compressors, to very large equipment such as steam turbines and generators.

The high rotordynamic stability comes from the reduction of cross-coupled stiffness that occurs when pads are free to tilt about their individual pivot points. This attenuates the destabilizing tangential oil film forces that can induce catastrophic subsynchronous vibration in machines equipped with conventional fixed-geometry bearings. Since so many machines are susceptible to this type of bearing-induced instability, there is a large demand for quality tilt-pad bearings.

Because of its many moving parts and manufacturing tolerances, the tilt-pad design is also the most complex and difficult to manufacture of all journal bearing designs. The design complexity is evident in the number of highly-machined parts required to make up the bearing. Clearance tolerances are additive in the built-up assembly of shell, pivots, and pads, requiring a high degree of manufacturing accuracy to yield acceptable radial shaft clearances. Pad pivot friction under high radial load can also lead to premature wear, or even fatigue failure, which can enlarge clearances and increase rotordynamic unbalance response. All of these requirements combine to make the tilt-pad bearing one which demands maximum attention to design, manufacturing, and materials.

Many of today's modern turbomachines, especially those running at high speeds and low bearing loads, require the superior stability characteristics of tilt-pad journal bearings to prevent rotordynamic instabilities. Until now, the design complexity of tilt-pad bearings has precluded their use in many small, high-volume applications where cost and size are important.

The present inventor has developed an improved, less complicated moving pad bearing construction. For example, U.S. Pat. No. 4,496,251 a pad which deflects with web-like ligaments so that a wedge shaped film of lubricant is formed between the relatively moving parts.

U.S. Pat. No. 4,515,486 discloses hydrodynamic thrust and journal bearings comprising a number of bearing pads, each having a face member and a support member that are separated and bonded together by an elastomeric material.

U.S. Pat. No. 4,526,482 discloses hydrodynamic bearings which are primarily intended for process lubricated applications, i.e., the bearing is designed to work in the working fluid. The hydrodynamic bearings are formed with a central section of the load carrying surface that is more compliant than the remainder of the bearings such that they will deflect under load and form a pressure pocket of fluid to carry high loads.

It has also been noted, in Ide U.S. Pat. No. 4,676,668, that bearing pads may be spaced from the support member by at least one leg which provides flexibility in three directions. To provide flexibility in the plane of motion, the legs are angled inward to form a conical shape with the apex of the cone or point of intersection in front of the pad surface. Each leg has a section modulus that is relatively small in the direction of desired motion to permit compensation for misalignments.

U.S. Pat. No. 5,054,938 also to Ide discloses a number of bearings particularly well-suited for high speed equipment. The bearings include fluid dampened support structures.

Such deflection pad bearings offer exceptional damping characteristics. In addition to the damping typically associated with tilt pad bearings, the support structure and fluid located between the webs also provide damping. It is even possible to provide an oil filled diameter membrane to increase damping. Moreover, because these bearings function without contact between moving parts they offer the possibility of virtually infinite life.

Despite the advantages offered by these bearing constructions, they have not yet been universally accepted. This can be attributed, at least in part, to the revolutionary nature of these bearings and the fact that they are a radical departure from "conventional" thinking in the field of fluid film bearings. In addition, when a fluid film bearing fails it often can completely seize without warning. The results could be catastrophic in a jet engine, for example. On the other hand, failure of a rolling element bearing is usually gradual and indicated by the increasing noise generated by the bearing. Moreover, rolling element bearings work, to some extent, even without lubricant. This certainly accounts for the continued use of rolling element bearings in jet engines, but does not explain the continued use of rolling element bearings in applications where loss of lubricant is less catastrophic, e.g., aeroderivative applications. For whatever reason, there remains a preference among some in the field for rolling element bearings. There is a need, therefore, for a simple inexpensive reliable system which provides good damping characteristics for both rolling element bearings and tilt pad bearings.

SUMMARY OF THE INVENTION

The present invention discloses a fluid dampened support primarily intended for a rolling element bearing, but which can also be used in conjunction with an advanced tilt pad bearing construction and methods of making the same. The bearings offer many of the rotordynamic advantages of tilt-pad bearings without sacrificing the advantages of rolling element bearings. This is achieved by applying the deflecting support-principle, previously used on movable pad bearings to rolling element bearings. These principles are described in co-pending parent application Ser. No. 07/309,081 filed Feb. 8, 1989 now U.S. Pat. No. 5,137,373 the complete disclosure of which is incorporated herein by reference. Thus, the support member which is preferably unitary, can be formed from a single piece of heavy walled tubing or a cylindrical journal that has been machined or formed with small grooves and slits, bores or cuts through or on the bearing wall to define a support surface and a flexible support structure.

All of the essential parts of the support structure are integrally formed from a single piece of material. This allows the bearing to be manufactured for much less than conventional designs. Moreover, because all of the component parts are integral, their position relative to each other is fixed. This allows the bearings to be manufactured to much closer tolerances than multipart assemblies where the tolerances of each part are additive. A split design can also be accommodated if this is found necessary for ease of assembly in certain applications. The split design does not change any of the operating characteristics of the design.

The present invention also relates to a dampening structure into which a rolling element or tilt pad bearing can be inserted. Virtually any reasonable dampening characteristic can be developed by controlling the structure and space between beams. Additionally, a flexible fluid dampened membrane may be used to support the support structure at the outer diameter.

In general, the bearing is supported on a series of circumferentially spaced substantially rigid pads. The pads are supported by springs. The springs preferably take the form of interconnected beams which support the ends of the pads. Additional springs or separate springs may also be provided. The movement of the pads against the spring support is preferably fluid dampened. The damper structure and characteristics may be varied in a number of ways.

The fluid dampened rolling element bearing according to the present invention includes an inner race; an outer race; and a series of balls or other rolling elements disposed between the inner race and the outer race such that the inner race is rotatably supported on the outer race by the rolling elements. A support structure is provided for supporting the outer race for radial and torsional movement. The support structure performs the function of a squeeze film centering ring in conventional damper assemblies. The support structure comprises a plurality of circumferentially spaced members separated from one another by narrow spaces. An incompressible fluid is provided in these spaces to allow fluid dampening.

Likewise, the support structure can be used to support a tilt pad bearing which includes a plurality of substantially circumferential bearing pads and a bearing housing extending radially outside the bearing pads and encircling the bearing pads with a plurality of thin webs equal in number to the number of bearing pads, each web extending radially between one of the pads and the bearing housing so as to support the pad on the bearing housing for pivoting movement. The outer housing is supported by the dampening support structure mentioned above.

In accordance with an important aspect of the present invention, the damper for supporting either a rolling element bearing or a tilt pad bearing includes a plurality of substantially rigid support pads for supporting the bearing. Each of the support pads include a radially inner surface supporting the bearing and a radially outer surface and spaced circumferential ends. A structural spring is provided to support each of the circumferential ends of each of the bearing pads so as to allow radial movement of the pads and, if desired, torsional movement of the pads. Each of the structural springs has a predetermined spring constant. The present invention provides a means for changing the spring constant of the structural spring after the spring has deflected a predetermined amount. Specifically, an adjustable post is provided to contact the structurals after a predetermined amount of deflection. The post contacts the spring, the effective length of the spring is shortened so that the spring constant is increased. By adjusting the space between the post and the spring the amount of deflection that occurs before the onset of the change in spring constant and be varied. Accordingly, the post is preferably mounted in an adjustment means such as threaded assembly or the like to allow movement of the post toward and away from the structural spring.

The damper of the present invention further includes a generally circular base supporting each of the structural springs. The base has a radially inner surface and a radially outer surface. The radially outer surface of each of the pads is spaced from the radially inner surface of the base so as to define a circumferentially extending damping gap. The damping gap is filled with an incompressible fluid so as to dampen movement of the pad with respect to the base. An orifice is provided at the circumferential ends of the gap to allow the incompressible fluid to flow into and out of the gap in response to movement of the pad relative to the base. The orifice is preferably defined by radially inward extending projections formed on the radially inner surface of the base. The size of the orifice is determined by the space between the circumferential edge of the pad and the surface of the projection. According to the present invention, the shapes of the circumferential edge of the pad and the projection can be designed such that the size of the orifice varies with deflection of the pad toward or away from the base. Specifically, the radially inward extending projection can be tapered away from the pad such that the orifice becomes smaller with pad displacement. Alternatively, the projection can be tapered toward the pad so that the orifice increases with pad displacement. Finally, the projection and edge can be non-tapered so that the size of the orifice remains constant with pad deflection.

The assembly is designed such that a space is provided between every point on the outer race and the outer periphery of the support member. If desired, the support structure may be in the form of a one-piece member formed with cuts and grooves to define a plurality of beams. The cuts and grooves can be formed through electric discharge machining so as to provide very narrow openings to enhance the fluid dampening effect. The support structure can be formed separate from the outer race to allow fluid dampened support of conventional, off the shelf rolling element bearings. Moreover, the support structure can include a continuous inner ring for supporting the outer race of the rolling element bearing or alternatively the inner ring could be formed by a series of special pads rather than a continuous ring. Other constructions are, however, possible. For example, the continuous inner ring and the outer race of the bearing could be integrally formed.

The support structure may include a fluid dampened membrane so that the support structure functions as a squeeze film damper. The support structure is designed to optimize the damping characteristics of the support structure. This can be done by modifying the support structure. The support structure can be designed to support the support surface for movement in up to six degrees of freedom (i.e., translation or movement in the +x, −x, +y, −y, +z and −z directions) and rotation about the X, Y, and Z axes so as to ensure damping at all times.

The support structure is preferably unitary (one-piece) and comprises support stubs, beams, and/or membranes connected to a housing which is sometimes defined by the radially outermost portion of the bearing in the case of a journal bearing or, in the case of thrust bearings, a housing into which the bearing is mounted.

The inventor has discovered that in many specific applications such as in high speed applications, it is necessary to examine and evaluate the dynamic flexibility of the entire system consisting of the shaft or rotor, the bearing and the fluid dampened support structure. In computer analysis of this system using a finite element model, it has been determined that it is necessary to treat the entire support structure as a completely flexible member that changes shape under operating loads. By adding more or less flexibility via machining of the basic structure, damping characteristics may be achieved that provide stable low friction operation over wide operating ranges. A number of variables have been found to substantially affect the support structures damping characteristics. Among the most important variables are the shape, size, location and material characteristics (e.g. modulus of elasticity etc.) of the support members defined by the bores, slits or cuts and grooves formed in a one piece member. The shape of the support members has been found to be particularly important. Also by providing a fluid backing to the flexible members, a high degree of damping may be achieved that further adds to system stability.

While there are numerous arrangements of bores, grooves, cuts, or slits there are primarily two modes of deflections: namely, one or more ligaments or membranes which deflect in the general direction of load in a bending mode and secondly, by torsional deflection in a beam or membrane in a direction extending away from the support surface along the longitudinal axis of the shaft. The degree of deflection in the bending mode is, in part, a function of the stiffness of the support structure in the radial direction. The cuts are specifically made to result in a predetermined shape under load. By surrounding or backing certain ligaments or membranes with lubricating fluid, an additional damping element may be added to the design.

Though various designs are possible, there are two key performance characteristics which the damper should have. First, the structure should have sufficient flexibility to ensure that actual squeezing of the fluid film occurs. Second, the damper should be capable of damping unbalanced loads in any direction.

The thickness of the gap between damper parts (corresponding to the squeeze film thickness) and the required flexibility are necessarily interrelated. The clearances between the damper parts must be small enough that the flexibility allowed by the support structure is sufficient. It is noted, in this regard, that pressure is a cubic function of thickness, i.e., pressure is proportional to the third exponential power of thickness. If the gap is very small then the support structure does not have to be so flexible. In accordance with the present invention, the thickness of the gap may be stepped to provide additional variation in damper properties.

Because the support structures of the present invention are essentially one-piece continuous beam networks, there is a relatively small space between the damper parts. Thus, to achieve proper squeeze film characteristics with the bearings of the present invention, the largest allowable space between damper parts is normally 3–5 mil and certainly not more than 8 mil. This does not present a significant problem because, in accordance with the present invention, the cuts which define the space between damper parts can be made using wire cut EDM (electrical discharge machining). Many EDM machines are capable of making cuts as small as 1 or 2 mil. If other machining techniques are used, such as a conventional wire cut EDM which leaves a gap of 10 mil or more, the space can be reduced by placing a separate shim in the gap.

In the support structures of the present invention, the flexibility depends primarily on the length and cross-section of the beams or ligaments which support the damper parts.

The bearing assembly of the present invention is especially well-suited for use in jet engines where damping is critical. Other specific applications of the bearings of the present invention include electric motors, fans, turbochargers, internal combustion engines, outboard motors, and compressors/expanders.

The support structure member may be formed of metals, powdered metals, plastics, ceramics or composites. The bearing can be tuned by, for example, changing the support structure and gaps to alter the stiffness. This in turn eliminates vibration. The present invention also contemplates easily moldable support structures which include no hidden openings such that they can be molded in a simple two-piece mold.

Various methods of manufacturing the supports of the present invention are also contemplated. The selection of a particular method of manufacturing depends largely on the volume of the particular support to be manufactured and the materials used.

In low volume applications, or when it is desired to produce prototypes for testing and/or production of molds or the like, the supports are preferably manufactured from metallic cylindrical blanks such as heavy wall tubing or other journals which are machined to provided radial and/or facing bores or grooves and formed with radial cuts or slits through either numerically controlled electrical discharge manufacturing techniques, numerically controlled laser cutting techniques, or numerically controlled water-jet cutting.

In intermediate volumes, the supports of the present invention are preferably manufactured using an investment casting method in accordance with the present invention.

In high volume applications, the supports of the present invention can be manufactured using a wide variety of materials such as plastics, ceramics, powdered and non-powdered metals, and composites. In high volume applications, a number of manufacturing methods, including injection molding, casting, powdered metal, die casting, and extrusion, can be economically employed. The supports of the present invention can be formed in a shape which is easily moldable.

The present invention offers a number of advantages over conventional designs. Unlike squirrel cage spring dampers, the present invention does not require any additional axial space beyond that already provided by the bearing. Unlike elastomer O-ring dampers, the present invention can accommodate a very wide range of stiffness values which can be predicted accurately and will not change with time or temperature. The damper of the present invention is also capable of taking a thrust load. Moreover, unlike many of the designs used with fluid film bearings which utilize a multiple of sector beams to provide a flexural support, the present invention includes a one piece support structure which can also be split for ease of assembly. The one piece construction allows for greater precision and ease in assembly by avoiding the problems of tolerance stack up which are inevitable with multipart designs. Further, unlike any of the existing squeeze film damper bearing designs, the present invention allows for changing of the squeeze film clearance space by, for example, inserting shims in the space to fine tune the design.

In operation, the construction of the present invention can isolate the squeeze film region into several pockets and prevents interaction between the cavities. This allows for maximizing of the damping that can be obtained from the damper. In the design of the present invention, the static weight offset can be accurately accounted for during the manufacturing of the ring. No special assembly routines will be needed to account for the static weight offset. The support structure can readily accept any existing antifriction bearing or fluid film bearing with only minor modifications to the bearing housing.

Finally, unlike any of the existing squeeze film damper designs, the present invention allows for only positive pressure generation in the damper bearing. The squeeze film cavities are designed so that separation of the surfaces does not follow as the journal moves away. This prevents the formation of negative pressure in the squeeze film cavity. Therefore, cavitation and air ingestion, which is a primary factor for the poor performance in most damper bearings, is completely eliminated.

BRIEF DESCRIPTION OF THE DRAWINGS

FIGS. 5A and 5B are cross sectional views of a cylindrical journal or blank prior to machining;

FIGS. 6A and 6B are cross sectional views of a machined journal or blank;

FIGS. 7A and 7B are cross-sectional views of a further machined journal or blank;

FIGS. 8A and 8B are cross sectional views of a modified machined journal or blank;

FIGS. 8C and 8D are cross sectional views of a support structure constructed from the modified machined journal or blank of FIGS. 8A and 8B;

FIG. 13 is a sectional view of a damper structure with additional separate spring supports.

FIG. 13A is a detailed view of FIG. 13 taken along the lines indicated in FIG. 13.

FIG. 13B is a detailed view of the damper structure of FIG. 13 as indicated.

FIG. 15 is a sectional view of a damper structure in which the squeeze film clearance is varied within the same sector or beam section.

FIG. 15A is a detailed view of the damper structure of FIG. 15 along the lines indicated.

FIG. 17 is a sectional view of a damper structure in which the stiffness is reduced by providing a longer support beam without reducing the effect of squeeze damping zone.

FIG. 17A is a detailed view of the damper structure of FIG. 17 along the lines indicated.

DETAILED DESCRIPTION OF THE ILLUSTRATIVE EMBODIMENTS

Figure 1:
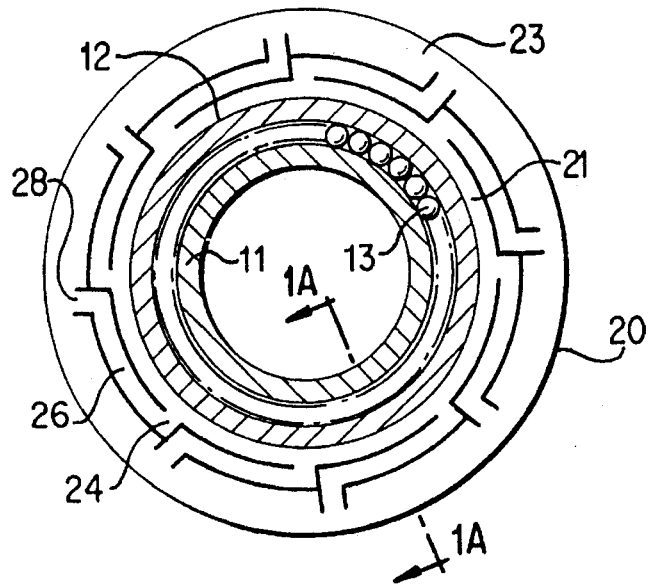
FIG. 1 is a sectional view of a rolling element bearing assembly which includes one form of fluid dampened support structure according to the present invention.

In describing the bearings and especially the support structure of the present invention in an understandable way, it is helpful to describe the support structures as being formed from a cylindrical blank by providing grooves, slits, bores and other openings in the cylindrical blank. As noted below, this is sometimes a useful technique for manufacturing a prototype support structure. The reference to the cylindrical blank is, however, primarily intended to assist understanding of the present invention. Although many of the support structures of the present invention could be manufactured from a cylindrical blank, it is not necessary that any of them be so manufactured. Indeed the support structure can be manufactured in numerous ways, some of which are discussed hereinafter.

Thus, the support structure may be described as a journal machined to define an inner peripheral ring or set of pads for supporting the outer race of the rolling element bearing, an outer periphery supported in housing and a network of beams and membranes providing flexible support for the inner periphery, and hence the bearing relative to the outer periphery and housing.

The primary flexibility of the support structure of the present invention is developed by small cuts or slits through the journal wall. These cuts provide the inner peripheral ring or pads with up to six degrees of freedom (i.e., the ring or pads can translate in the +x,−x, +y,−y, +z and −z directions as well rotate about the x, y and z axes) and are designed to optimize the damping characteristics of the support structure. The cuts or slits can be provided to provide a continuous cylindrical membrane. The membrane acts as a fluid damper upon which the remainder of the support structure and the rolling element bearing are supported. The flexibility of the membrane, combined with the fluid lubricant, provides a means to vary the damping action and to isolate the pad from the housing. The damping takes the form of a dash pot that exhibits high damping characteristics.

Throughout this description, the same or similar reference numerals are used to refer to the same or similar element.

Referring first to FIG. 1, one of the currently preferred embodiments of the present invention is shown. The roller bearing assembly shown therein includes conventional rolling element bearing components such as the inner race 11, outer race 12 and rolling elements 13 such as balls or rollers. These components are of a conventional construction. Indeed, this portion of the assembly may be provided through the use of a simple "off the shelf" ball, roller, or needle bearing assembly. Many such assemblies include additional components such as, for example, a cage to separate the rolling elements from one another.

In accordance with the present invention, the conventional rolling element bearing components 11, 12 and 13 are supported by fluid dampened support structure generally indicated at 20. The support structure 20 is formed with grooves and slits so as to define a continuous inner ring 21, an outer periphery 23 and a network of circumferentially spaced beams 24, 26 and 28. the inner ring 21 serves as a support surface for supporting the outer race 12. The outer periphery 23 is adapted to be supported in a rigid housing or the like. The network of circumferentially spaced beams 24, 26 and 28 support the radially inner support surface 21 and hence the inner race 11, outer race 12 and rolling elements 13 of the assembly for movement relative to the outer surface 23.

As shown in FIG. 1, the beam network includes a series of eight stub-like beams 24 which provide the only connection between the beam network and the inner support ring 21. Each of the stub-like beams 24 is connected at one end to the inner ring 21 and at its other end to a circumferentially extending beam 26. The circumferential beams 26 are each connected to the stub section or beam 24 at one end and to a second stub-like beam 28 at the opposite end such that the beams act as cantilever supports. The beam sections 28 are in turn connected to the circumferential beams 26 at one end and to the outer periphery 23 at their opposite end. As can be seen from FIG. 1, the cuts and slits are arranged to provide an open space between every point on the inner support surface and the outer periphery of the support structure. This gives the support structure significant radial flexibility.

Figure 1A:
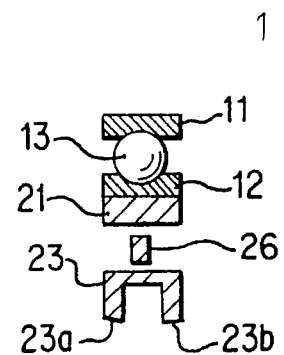
FIG. 1A is a sectional view along the lines indicated in FIG. 1.

If additional flexibility is desired, facing grooves can be formed on the sides of the support structure to reduce the torsional stiffness of the support structure. In particular, as shown in FIG. 1A axially extending facing grooves can be provided on each side of the support structure so as to reduce the axial dimension of one or more of the beams and the support structure thereby reducing the torsional stiffness of the beam.

If even more dampening is desired, a radial extending groove can be formed in the outer periphery of the support structure 23 so as to define a membrane upon which the beams are supported. Specifically, as shown in FIG. 1A the provision of a groove results in formation of two circumferential beams 23a, 23b which are connected to another body and membrane the thickness of which is dependent upon the depth of the groove.

When used in high speed equipment such as jet engines, the rolling element bearings are typically located in a sealed chamber which is flooded with lubricant to remove the heat generated by the movement of the rolling elements. When the rolling element bearing assembly of the present invention is located in such a flooded chamber the lubricant will naturally fill the spaces between the various beams. The fluid located in the interstices of the support acts like fluid in a dashpot to provide dampening of the movement of the beams in the support structure.

Figure 2:
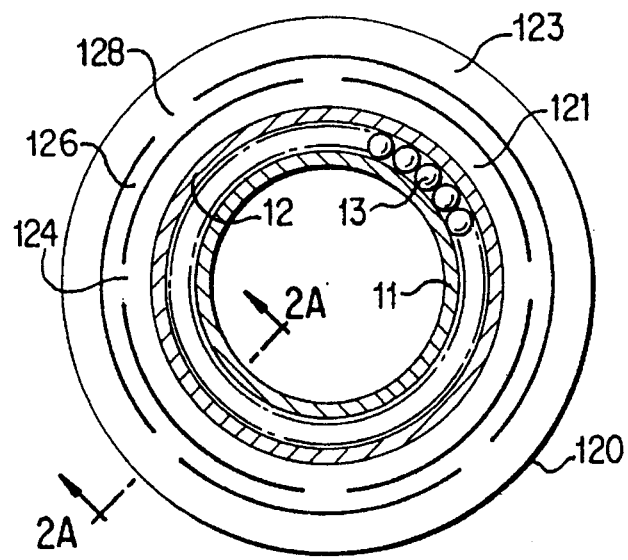
FIG. 2 is a sectional view of a second rolling element bearing assembly according to the present invention.

Another currently preferred embodiment of the support structure of the present invention is shown in FIG. 2. As shown there, the rolling element bearing assembly, illustrated somewhat schematically, again includes an inner race 11 and outer race 12 and rolling elements 13. The support structure generally indicated at 120 includes a continuous inner ring 121, an outer periphery 123 and a network of beams 124, 126 and 128. Again, the network of beams is formed by a spaced series of slits formed in a continuous journal. In this case, however, the slits are all circumferential as shown in FIG. 2. The nature of these support structures is, however, essentially the same. Specifically, the support structure includes a series of, in this case, four stub sections or beams 124. A series of circumferential beams 126 connected at one end to the stubs 124 and at the opposite end to stubs 128. The stubs 128 are connected at their opposite end to the outer periphery 123. From FIG. 2, it can be seen that each stub 124 has two circumferential beams 126 extending therefrom and that each of the secondary stubs 128 supports two circumferential beams 126. Again, the support structure is arranged so that there is an open space between every point on the inner ring 121 and every point on the outer periphery 123.

Figure 2A:
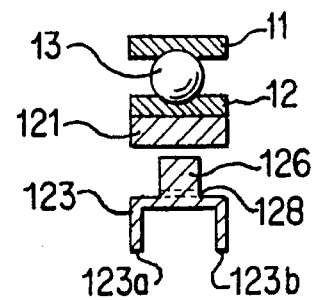
FIG. 2A is a sectional view along the lines indicated in FIG. 2.

Additionally, as with the previous embodiment, if desired, torsional flexibility can be added to the support structure by providing axially extending facing grooves on the sides of the support structure. Specifically, as shown in FIG. 2A the support structure can be provided with facing grooves to reduce the torsional stiffness of one or more of the beam elements. If even more damping is desired, a radially inward extending groove may be formed in the outer periphery 123 so as to provide a membrane support for the beam network. The provision of the radially inwardly extending groove defines two circumferentially extending beams 123a, 123b supporting the membrane as shown in FIG. 2A.

When the bearing assembly shown in FIG. 2 is located in a flooded container such as that used in high speed applications, the lubricant will fill the gaps between the beam elements and also fill the base underlying the membrane. In this way, the lubricant will act as a fluid dash pot to dampen movement of the support structure elements.

Figure 4:
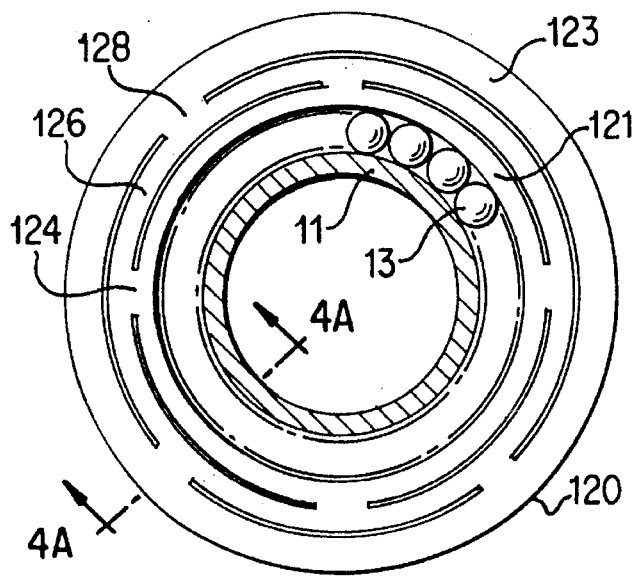
FIG. 4 is a sectional view of a rolling element bearing having a fluid dampened support structure integrally formed with the outer race.
Figure 4A:
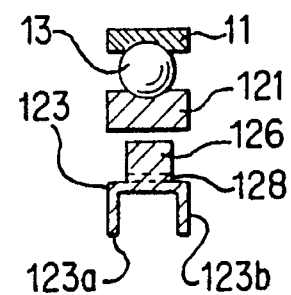
FIG. 4A is a sectional view along the lines indicated in FIG. 4.

The previous embodiments disclose support structures which are particularly well suited for retrofit applications in which the conventional bearing is provided with a separate support structure to provide the desired damping. This is currently the most likely application of the invention. It should be understood, however, that the inner ring 21, 121 of the support structures disclosed herein could, if desired, be used as the outer race of the rolling element bearing assembly. An example of such a construction is shown in FIGS. 4 and 4A and discussed below. Such an assembly can simplify the assembly if assembly were to be built entirely in one location. Of course, the outer race of typical rolling element bearings must have certain material characteristics which might require more expensive material than one might want to use on the support structure. Accordingly, it still may be advantageous to form the outer race and the inner ring of the support structure separately.

In addition, in the previously described embodiments, the inner support ring is continuous. This ensures that the rolling element bearing and particularly the outer race can be securely retained by the support structure. It is, however, possible to use support structures in which the outer race is supported in a circumferentially spaced pads rather than on a continuous ring. Support structures having such a circumferentially spaced series of pads can be designed along the principles described in the previous application and used for bearings.

The use of separate pads rather than a continuous ring offers both advantages and disadvantages. One disadvantage associated with support structures having separate pads for supporting the outer race is that as the deflection of one pad occurs, the tightness of the fit of another pad is loosened. To accommodate this, the outer race must be pressfit to some extent in the support structure. There is also a greater possibility for unbalanced damping when separate pads are used. This can, however, be minimized by designing the support structure such that the loads are evenly shared. A major advantage of separate pad supports is that their performance is more easily modeled and reliably predicted. Additionally, separate pad supports have greater flexibility. At present both continuous and separate pad supports appear to be promising. Accordingly, there is no universal preference for one or the other at this time. The selection of one or the other must therefore be made on a case by case basis taking the foregoing into consideration.

Figure 3:
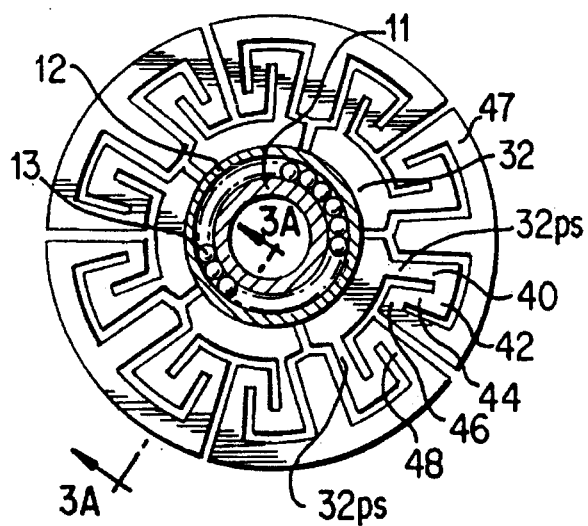
FIG. 3 is a side view of another fluid dampened support structure according to the present invention.
Figure 3A:
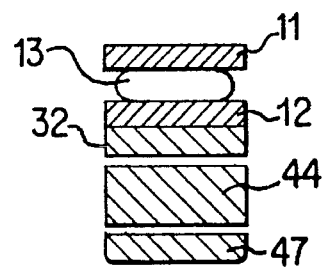
FIG. 3A is a radial cross-section of a portion of the support structure illustrated in FIG. 3.

FIGS. 3 and 3A illustrate one such separate pad embodiment. More specifically, FIGS. 3 and 3A illustrate the possibility of using a journal bearing as multipad support structure in accordance with the present invention. It should be appreciated, however, that a wide variety of support structure arrangements with a separate pad could be constructed in accordance with the principles previously set forth in the application incorporated herein by reference.

The construction illustrated in FIGS. 3 and 3A is bi-directional, i.e., the structure is symmetrical about its center line. Like the previously described supports, the support of FIGS. 3 and 3A is formed with a plurality of thin radial and circumferential slits. In this case, however, the slits define a plurality of circumferentially spaced support pads 32.

The structure supporting each of the support pads 32 is such that each pad 32 is supported by a beam support structure at two pad support surfaces 32ps. The beam network connected to the support pads at each pad support surface 32ps is identical, yielding the symmetrical construction which makes the support bi-directional. For purposes of simplifying this description, only the network of beams which supports the pad at one pad support surface will be described since the other pad support surface supported in an identical fashion. Thus, as shown in FIGS. 3 and 3A, a first, generally radially extending beam 40 is connected to the pad 32 at the pad support surface 32ps. A second, generally circumferential beam 42 is connected to the radially outermost end of beam 40. A third, generally radial, beam 44 extends radially inward from the beam 42. A fourth, generally circumferential beam 46 extends from the radially innermost portion of the beam 44. A fifth, generally radial beam 48 extends radially outwardly from a beam 44 to the housing portion 47 of the support structure. In summary, each pad 32 is supported by ten beams and the bearing housing.

Further, by forming radially extending circumferentially spaced grooves or continuously extending circumferential grooves in the housing portion of the support structure, the housing portion of the support structure can be designed to act as a plurality of beams or membranes. Thus, as a result of the beam on beam two point support, the pad acts like a spring-like membrane.

As mentioned above, in some instances it may be desirable to make the inner support ring of the support structure integral with the outer race of the rolling element bearing. FIGS. 4 and 4A illustrate such an assembly. As shown therein, assembly is essentially identical to that of FIGS. 2 and 2A except that the outer race of the bearing and the inner ring of the support structure are a single piece.

The assembly shown in FIG. 4 is not, however, currently preferred. As known to those skilled in the bearing art, the races of rolling element bearings must be manufactured to exacting specifications and often made of durable materials. It is currently expected that providing such a race integrally with the support structures of the present invention might be unduly complicated. For these reasons, the integral construction shown in FIGS. 4 and 4A is not currently preferred. Nevertheless, it should be appreciated that construction shown in FIGS. 4 and 4A operates in essentially the same way as the construction shown in FIGS. 2 and 2A.

While certain examples are described above, it should be appreciated that numerous modifications to the support structure are possible. For example, the deflection and damping characteristics of the support structure can be modified by changing the angle of the beams, changing the location of the holes or openings which define the legs, varying the length of any of the beams or membranes, and changing the width or thickness of any of the beams or membranes. Other possible modifications of beam mounted support structures are described in co-pending application Ser. No. 309,081 incorporated by reference above.

As noted earlier, there are two key performance characteristics which the damper should have. First, the structure should have sufficient flexibility to ensure that actual squeezing of the fluid film occurs. Second, the damper should be capable of damping unbalanced loads in all directions.

The thickness of the gap between damper parts (corresponding to the squeeze film thickness) and the required flexibility are necessarily interrelated. The clearances between the damper parts must be small enough that the flexibility allowed by the support structure is sufficient.

Because damping pressure is a cubic function of thickness, the gap must be very small to accommodate the moderate flexibility of the support structures of the present invention. To achieve proper squeeze film characteristics with the bearings of the present invention, the largest allowable space between damper parts is normally 1–5 mil and no more than 8 mil. Accordingly, the cuts which define the space between damper parts are preferably made using wire cut EDM (electrical discharge machining). Many EDM machines are capable of making cuts as small as 1 or 2 mil. If other machining techniques are used, such as a conventional wire cut EDM which leaves a gap of 10 mil or more, the space can be reduced by placing a separate shim in the gap.

In the support structures of the present invention, the flexibility depends primarily on the length and cross-section of the beams or ligaments which support the damper parts. The deflection characteristics of any particular beam configuration can easily be obtained from a structural engineering handbook.

Figure 9:
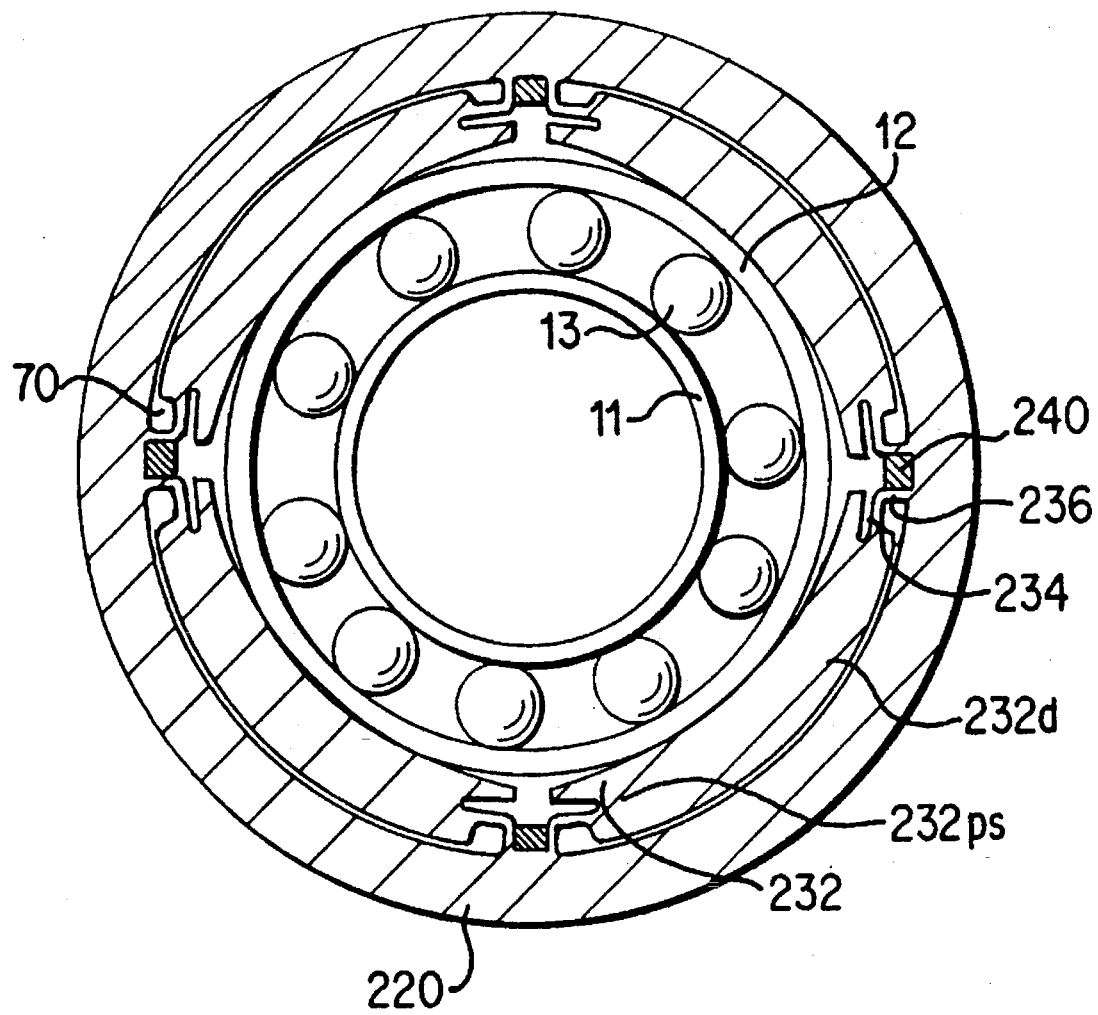
FIG. 9 is a sectional view of another rolling element bearing assembly according to the present invention.
Figure 9A:
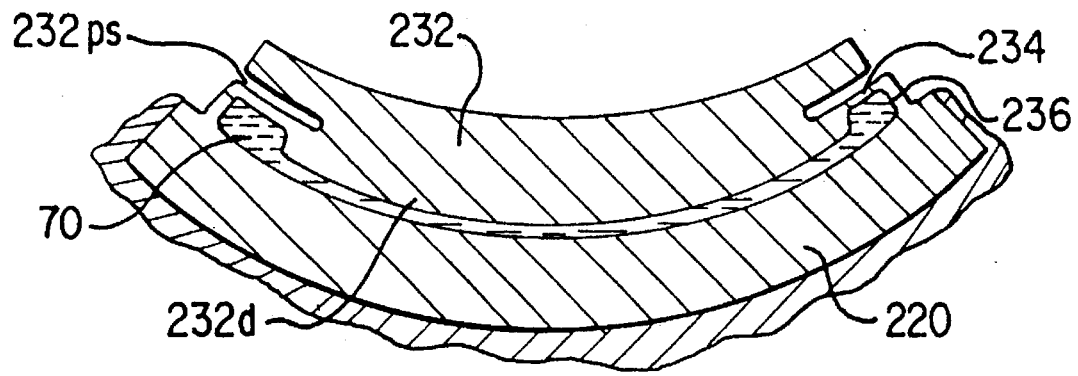
FIG. 9A is a detail view showing one section of the support structure of the assembly shown in FIG. 9.
Figure 9B:
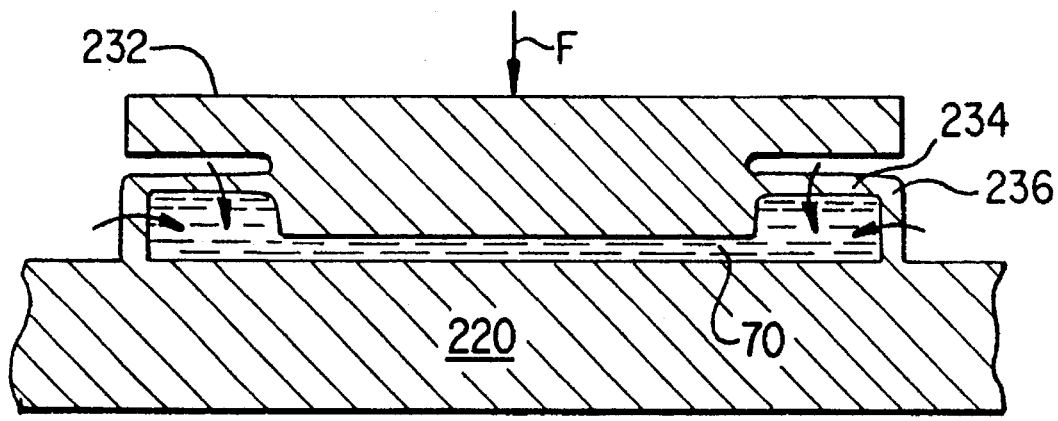
FIG. 9B is a simplified model of the damper structure depicted in FIG. 9A.
Figure 9C:
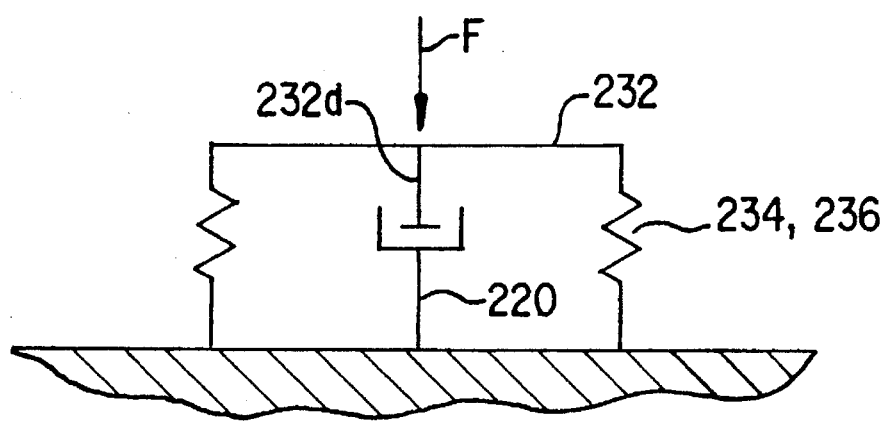
FIG. 9C is a schematic representation of the damper structure depicted in FIG. 9B.

Taking these factors into account another, currently preferred, embodiment of the present invention which is depicted in FIGS. 9–9C will be described. As shown in FIG. 9, this embodiment is of a pad type support structure. The support structure includes four circumferentially spaced pads 232. Each of the pads 232 rest on a pad surface 232ps which is supported by a dog legged shaped beam network which acts as a structural spring. The pads are substantially rigid, i.e., they do not bend or deform under load. More specifically, the beam network includes a circumferential beam 234 extending from each circumferential end of the pad support surface 232ps and a radial beam 236 extending radially at a sharp angle away from the circumferential beam 234 to the outer periphery portion 220.

As can be appreciated from FIGS. 9 and 9A, the beams 234 and 236 are quite thin. On the other hand, the beams are relatively short. Thin beams tend to be more flexible, but short beams tend to be less flexible. Thus, the support structure as a whole would have a moderate flexibility. The specific dimensions necessary can be determined either through beam, plate or shell theory or, preferably, through finite element analysis. The pad member 232 also includes a damper portion 232d at the radially outermost portion thereof. The damper portion 232d extends radially outward to define a thin squeeze film gap with the outer periphery portion 220. As mentioned before, the gap should be, normally, in the range of 1–5 mil. The gap is filled with a hydraulic fluid 70 or the like.

The support structure is essentially formed from a single piece. If it is desired to control deflection of the radial beams 236 in one direction, however, deflection control inserts 240 can be inserted into the support structure to prevent the beam 236 from deflecting away from the beams 234. As explained below, such deflection is neither necessary nor desired to achieve damping performance. Instead, beam 236 must deflect in the direction indicated in FIG. 9B to achieve proper damping.

As shown in FIG. 9, the pads 232 of the support structure are formed with a larger diameter than the outer diameter of the rolling element bearing to provide a positive preload. Such machining of different diameters for each of the pad is somewhat more expensive than simply milling a uniform diameter, but such pad construction offers a performance advantage in the construction shown in FIG. 9. In particular, loads from the shaft or bearing are received on or near the circumferential center of the pad 232 so that the pad acts as a damper and deflects virtually radially rather than with a wedge shape as in a hydrodynamic bearing. In other words, supporting the outer race only at or near the center of the pads causes the force on the support structure to act at or near the center so that the structure functions as shown in FIGS. 9B and 9C with the load applied centrally. This ensures proper damper performance.

In the structure shown in FIGS. 9 and 9A, the support structure, i.e., squeeze film centering spring, includes four distinct segments which form a continuous ring. Naturally, the number of segments can be varied if desired. It should be noted, however, that damping values can become undesirably low if too many segments are used.

With the assembly shown in FIG. 9 and 9A, as the bearing whirls or vibrates, it tends to displace one or two of the segments at any particular time. This will cause the segments to move radially and squeeze the oil 70 in the small clearance cavity. The squeezing action will generate a pressure which when multiplied by the area results in a force proportional to the velocity of the journal. This force is a damping force that tends to dampen and reduce the vibration levels in addition to the forces transmitted to the bearing housing and structure.

The thickness and length of the web sections at both ends of each segment determines the stiffness of the support. A wide range of stiffness values can thus be achieved with dimensional change to these critical sections. The squeeze film cavity can also be shimmed to vary the clearance between the damper portion and the outer periphery portion so as to fine tune the damper performance. For horizontal applications, i.e., applications in which the shaft is not displaced from the horizontal position, the bottom two segments can be sized to account for the static weight offset thus eliminating the need for delicate and difficult field adjustments. Multiple cavities or segments can be designed so as to work in series or parallel with the cavity shown and thus provide a wider range of design capability.

In simple terms, the damper construction shown in FIGS. 9 and 9A operates as a simple fluid dashpot as represented schematically in. FIG. 9C. This can best be understood by reference to FIG. 9B which is a simplified version of the segment depicted in FIG. 9A. Thus, although the segment depicted in FIG. 9A is circumferential, it is useful to consider it as a straight structure of the type shown in FIG. 9B. Because the pads 232 have a larger diameter than the outer race 12 of the rolling element bearing, the force applied to the support structure of the shaft or bearing acts at or near the circumferential center of the pad as shown in FIG. 9B. This force F causes the beams 234 and 236 to deflect in the direction indicated by the small arrows such that the damper portion 232d of the pad 232 squeezes the narrow film between it and the outer periphery 220.

This system may be schematically represented as shown in FIG. 9C as a dashpot with springs at each end of the supported member 232. In this case, the beams 234, 236 provide the spring function and the damper portion 232d and outer periphery 220 along with the fluid film therebetween provide the dashpot performance.

The damper construction of the present invention can also be used to support a tilt pad bearing of the type disclosed in co-pending application Ser. No. 07/878,601 filed May 5, 1992.

Figure 9D:
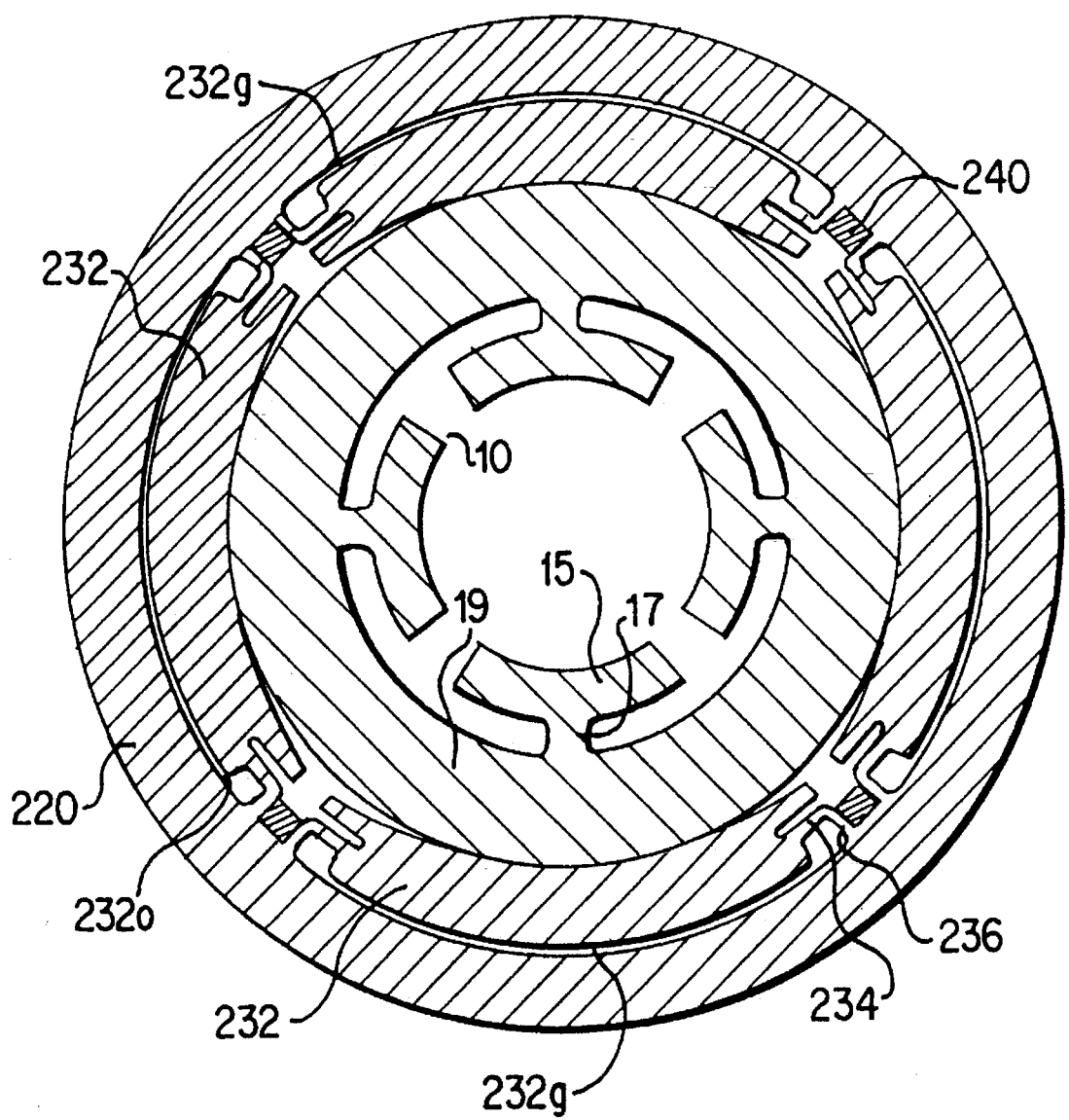
FIG. 9D is a sectional view of a fluid dampened one-piece tilt pad bearing according to the present invention.

FIG. 9D shows a tilt pad bearing supported in a damper of the type illustrated in FIGS. 9–9C. The difference between the overall bearing assembly shown in FIG. 9D and that shown in FIGS. 9–9C resides only in the use of a tilt pad bearing instead of a rolling element bearing. Thus, the damper again includes four circumferentially spaced pads 232. Each of the pads is supported by a dog-legged shaped beam network which acts as a structural spring. The beam network includes a circumferential beam 234 extending from a circumferential end of the pad and a radial beam 236 extending radially at an angle away from the circumferential beam 234 to support that beam on the outer periphery portion or base 220.

The tilt pad bearing 10 is of the type which includes a plurality of circumferentially spaced pads each of which is supported on a continuous base by a support structure which, can be in the form of a multibeam support structure or, more simply, in the form of a web or ligament which is thin enough to exhibit tilt pad performance. The number of pads and dimensions of the beams or ligaments can vary according to the needs of any particular application. In those constructions in which the pads are supported on a single thin web the performance of expensive multi-part rocking pivot pad bearings can be replicated in a single-piece bearing. The pivot stiffness of the pads is determined by the support web thickness. When the web thickness is low enough, tilt pad behavior results, i.e., the pad tilts with almost no rotational stiffness.

In accordance with one aspect of the present invention, the single piece tilt pad bearing and the single piece damping support structure may be integrally formed as a one-piece bearing and damper. Although this construction is not illustrated it could be similar to the assembly shown in FIG. 9D with the bearing 10 bearing integrally connected to the support pads 232 at its base 19.

FIG. 9D illustrates one example of the tilt pad bearing supported in a damper according to the present invention. The bearing 10 is designed to operate in a liquid filled environment. In operation, the pads 15 tilt so as to pressurize the liquid. As shown, the bearing includes four spaced bearing pads 15. The number of bearing pads can, of course, be varied to suit any particular application. The bearing pads 15 are each supported on a bearing housing 19 via a single thin web-like ligament 17 which extends generally radially between the pads and the bearing base or housing. As shown, the ligament has a radial length which significantly exceeds its circumferential width.

In the embodiment illustrated, the web 17 is provided on the circumferential centerline of the pad 15 so the bearing supports the shaft for rotation in either the clock wise or counter clock wise direction, i.e., the bearing is bidirectional. If bidirectional operation is not necessary, the web can be attached closer to the trailing edge of the pad to increase wedge stiffness.

Figure 9E:
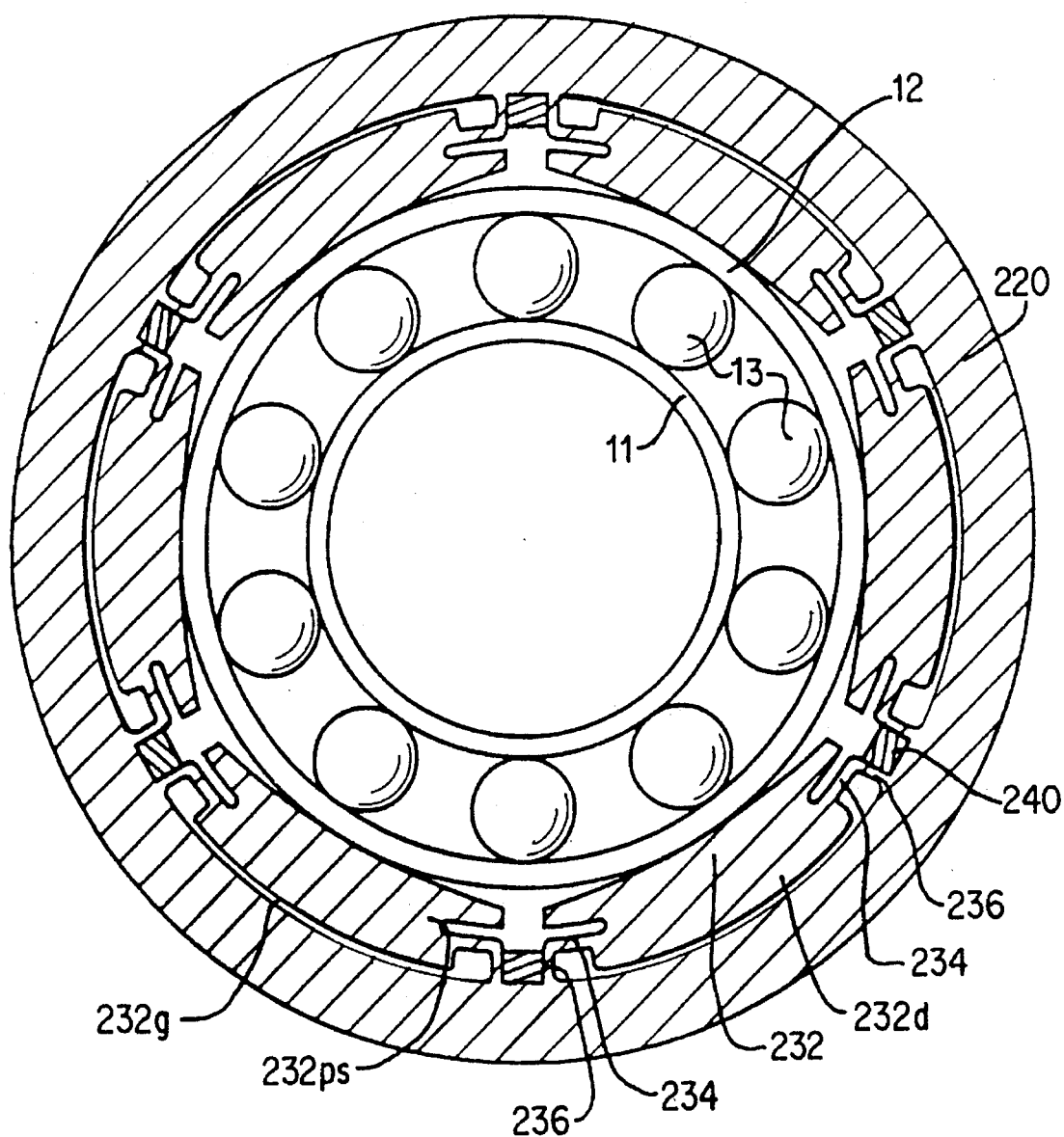
FIG. 9E is a sectional view of a rolling element bearing assembly similar to that of FIG. 9, but having six damper pads.
Figure 9F:
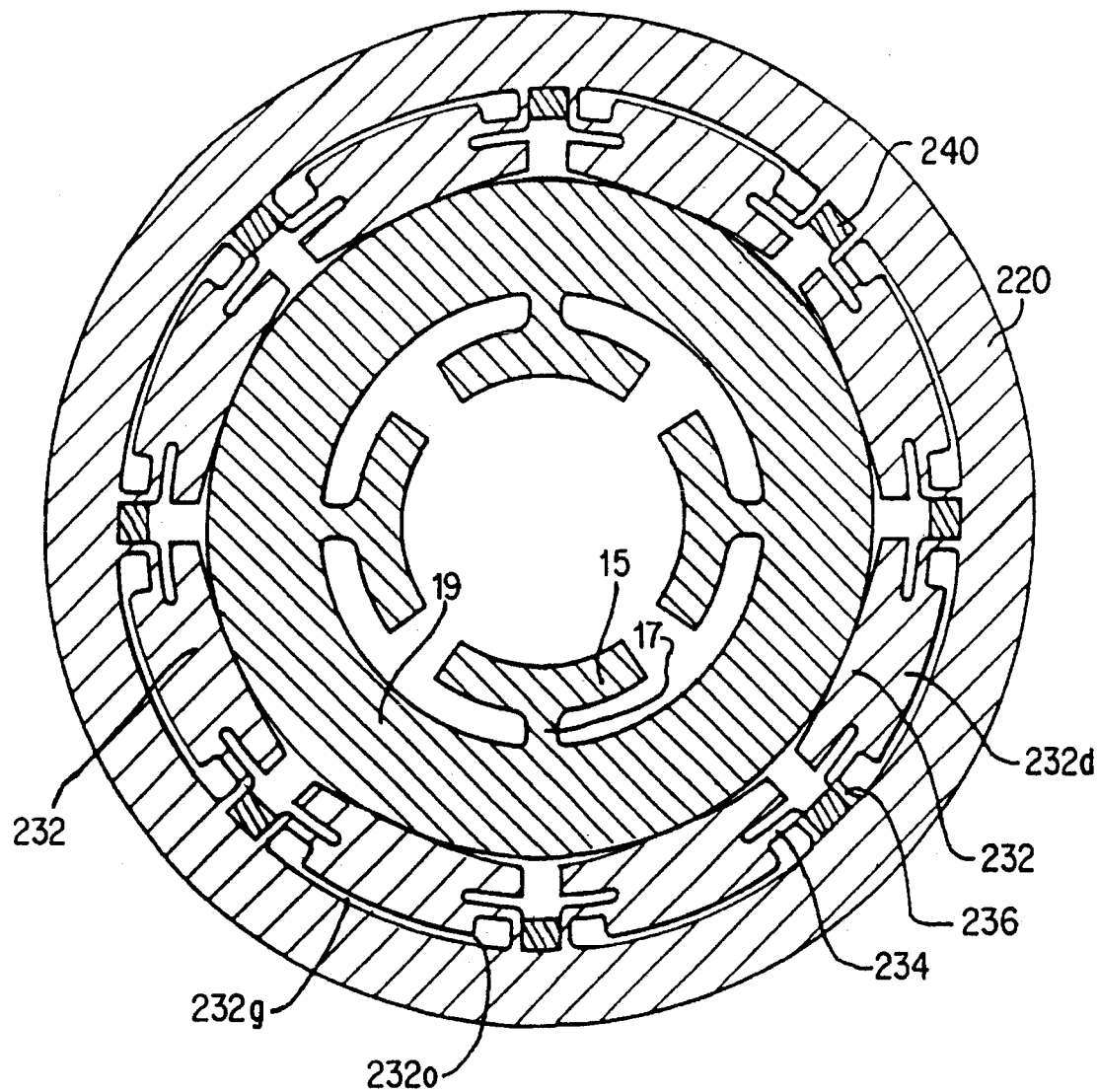
FIG. 9F is a sectional view of a fluid dampened tilt pad bearing similar to that of FIG. 9D, but having eight damper pads.

As noted above in connection with FIGS. 9 and 9A, the number of distinct segments which form the continuous damper ring of the integral centering spring squeeze film damper can be varied if desired. FIGS. 9E and 9F illustrate this possibility. Specifically, FIG. 9E shows a dampened roller bearing assembly very similar to that of FIG. 9 except that the assembly of FIG. 9E includes six pads 232 rather than four as shown in FIG. 9. FIG. 9F shows a tilt pad bearing assembly very similar to that of FIG. 9D except that the assembly of FIG. 9F includes eight pads rather than four as shown in FIG. 9D. The number of pads used is typically dictated by the stiffness required and the amount of deflection desired. The number of pads can vary from one to any number of sectors. Again, however, it should be noted that damping values can become undesirably low if too many segments are used.

If desired, the damping ring may be split in two halves for ease of assembly without affecting its performance as a unit.

The squeeze film damper constructions shown heretofore can be modelled on a computer using finite element analysis and designed for any particular application. In some instances, however, it is advantageous to be able to adjust the damping characteristics after the assembly has been constructed to allow fine tuning or adjustment for actual operating conditions. Moreover, the ability to vary the stiffness of the damper's spring makes it possible to vary the critical speed of the rotor. The stiffness also indirectly affects the effective damping that can be obtained. A lower spring stiffness permits more damper motion and, consequently, more damping. Too much damping causes the bearing to lock-up and act like a very stiff support. Therefore, the ability to vary the damping and match the bearing damping to the particular application is very important. The present inventors have devised arrangements whereby two important damper characteristics, namely spring constant and orifice size can be varied during operation.

In the squeeze film damping constructions disclosed heretofore, the damping characteristics are set once the damper is constructed.

These arrangements are particularly well suited for a damper construction in which the support pads are supported by structural springs on their circumferential ends. The structural springs are in the form of first beam or ligament supported on another, second, beam or ligament at one end and supporting the pad at its other end. The spring constant or force required per unit displacement of such a structural spring depends on the length of the first beam.

In accordance with the present invention, the effective length of the beam can be shortened by providing a post which is spaced a predetermined distance from the structural spring so that the structural spring contacts the post after a certain amount of deflection. When the effective length of the beam is shortened during deflection in this way, the spring constant is increased so that the structural spring has, in effect, two different spring stiffnesses.

The gap or spacing between the post and the structural spring determines the range of radial displacement in which the softer spring constant operates. The high stiffness range becomes active when the gap closes and the structural spring becomes shorter and stiffer. As shown in FIG. 10B (discussed below), the location of the post and the gap distance can be used to provide a wide range of stiffness characteristics in the squeeze film damper.

The stiffening of the spring after a predetermined displacement can, for example, be used to provide safer operation of an aircraft engine in the event of a blade loss by preventing blade rub and reducing or eliminating the impact the rotor can make against the damper housing.

There are other advantages associated with adjustable spring stiffness and variable damping. Spring stiffness is often the variable utilized to change the location of the critical speed and the amount of effective damping in the squeeze film damper. The stiffness can also be used to control the amount of rotor deflections for purposes of maintaining the blade tip clearance. Varying the amount of damping can prevent damper lock-up problems. Controlling the amount of damping can reduce the forces transmitted to the housing from the rotor. Certain damper designs have a step in the squeeze film land to prevent shaft movement beyond a certain point radially. This step will result in a non-linear spring effect and the impact of the rotor can result in undesirable rotor vibrations. The harder spring in the damper design of the present invention will have some non-linearity, but will have better absorption than the rigid step in the damper. There is no need to use a step in the damper as a stop since it degrades the damper performance and can result in undesirable non-linear behavior.

In addition, the present inventors have found that the orifice at the end of each pad or sector can be varied to provide different end seal conditions. This can also add stiffness to the squeeze film damper not available in the traditional squeeze film damper designs. The orifice can be made to become smaller, remain constant, or become larger as the journal or pad is displaced radially. Depending on the need and application, the orifice configuration can be adjusted to provide the optimum performance for the specific application. This design feature can also be used to control the amount and extent of cavitation in the damper since cavitation and air entrainment are influenced by the orifice size and the end seals.

Having described the general nature of the adjustability features discovered by the present inventors, specific structures incorporating such features will now be described with reference to FIGS. 10–11C.

Figure 10:
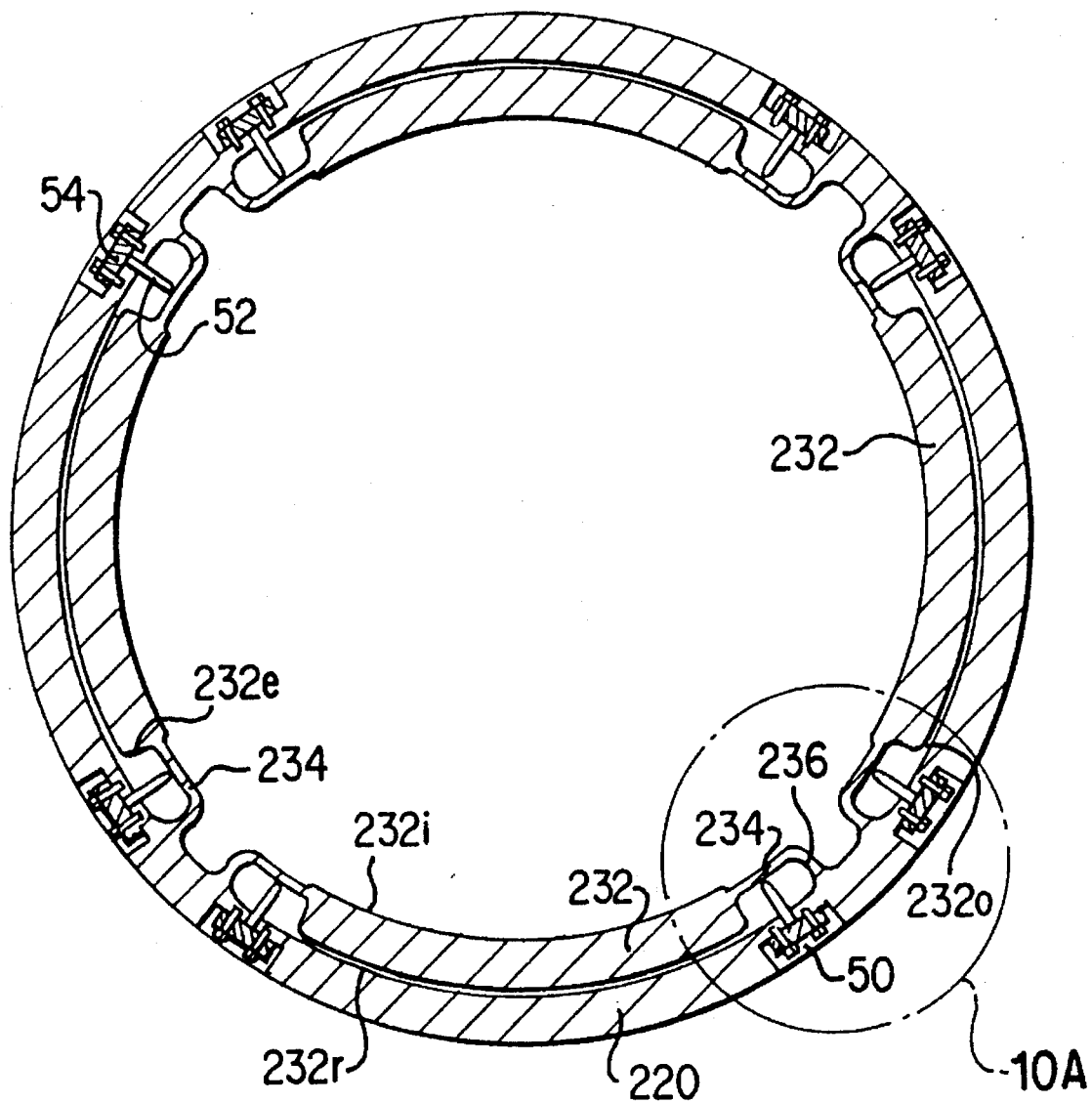
FIG. 10 is a sectional view of a damper structure with a variable stiffness characteristic.
Figure 10A:
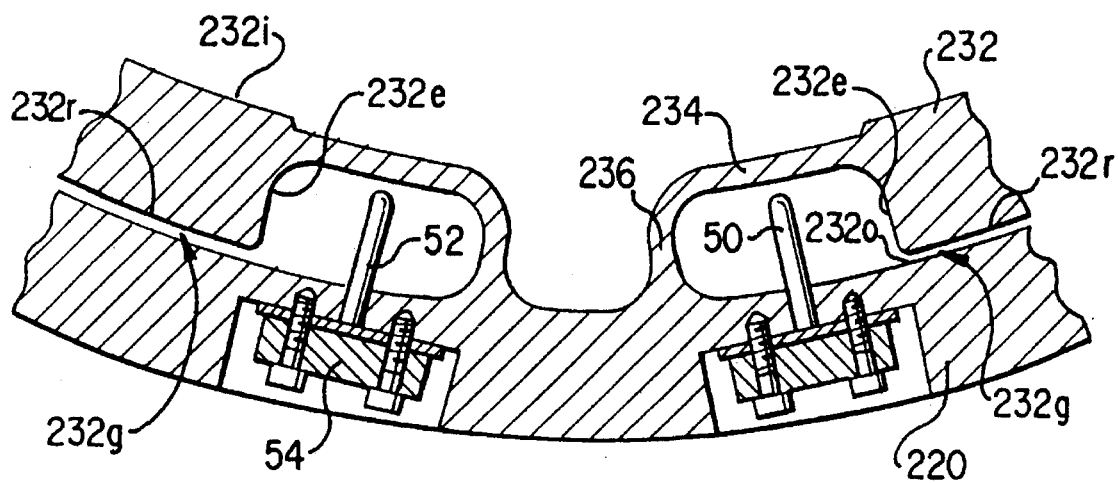
FIG. 10A is a detail view of the damper structure of FIG. 10.
Figure 10B:
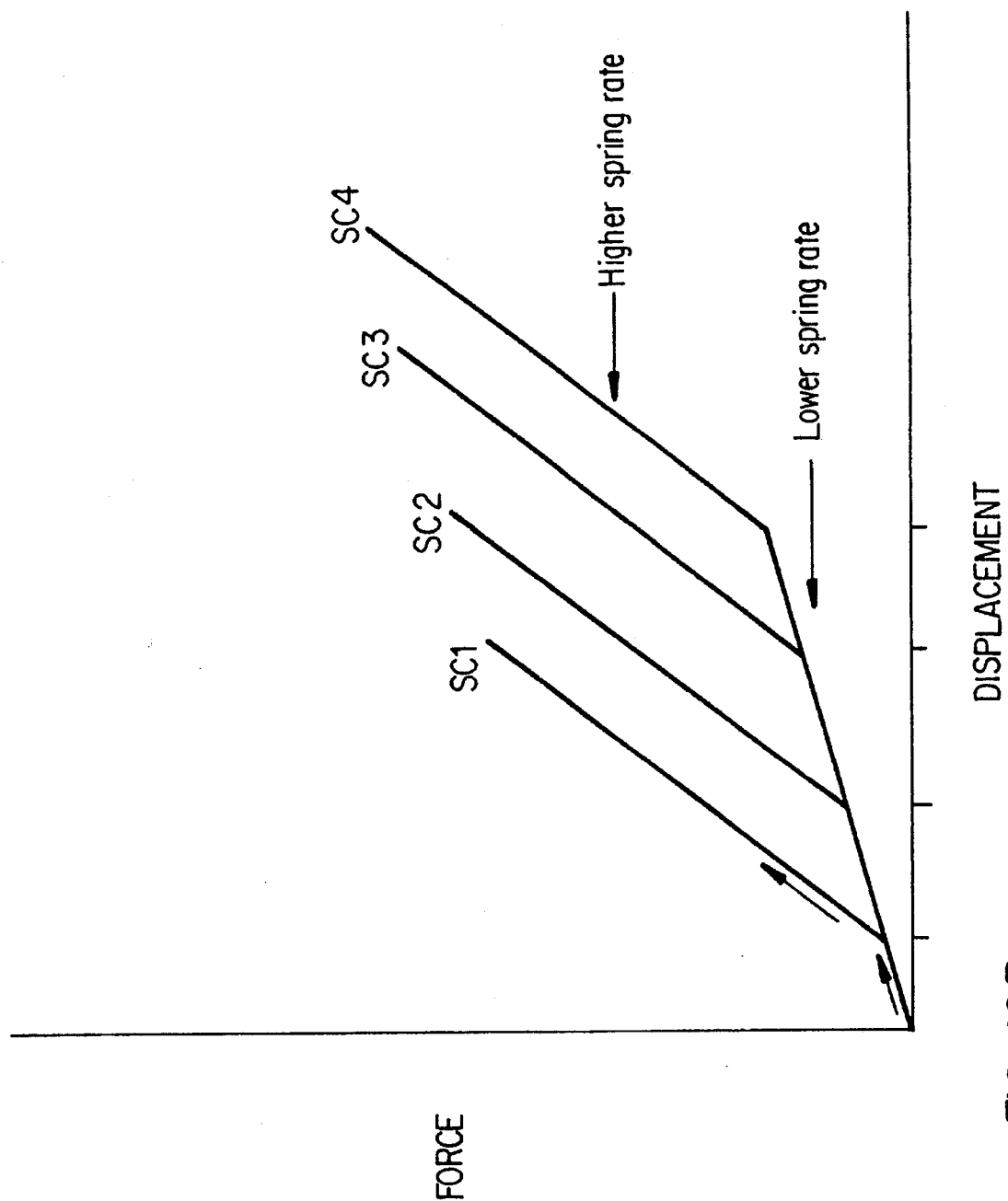
FIG. 10B is a graph showing force as a function of displacement to illustrate various spring characteristics.

FIGS. 10 and 10A show a damper construction in which the spring rate of the structural support spring changes (becomes higher) at some point as the pad moves radially. The point at which the spring rate changes can be adjusted.

The squeeze film damper construction shown in FIGS. 10 and 10A is similar to that shown in FIG. 9. Specifically, the damper includes four circumferentially spaced pads 232. Each of the pads has a radially inner surface 232i, a radially outer surface 232r and two circumferential ends 232e. The pads 232 are supported on their ends 232e by a dog-legged shaped beam network which acts as a structural spring. The beam network includes a circumferential beam portion 234 extending from each circumferential end 232e of the pad 232 and a radial beam portion 236 extending radially at an angle away from the circumferential beam 234 to the outer periphery portion or base 220.

As can be appreciated from FIGS. 10 and 10A, the beams 234 and 236 are quite thin. Thin beams tend to be more flexible, but short beams tend to be less flexible. Thus, the flexibility of a support structure which includes beams of fixed thickness depends on the effective length of the beam.

The radially outer surface 232r of each of the pads 232 is spaced from the inner surface of the base 220 to define a squeeze film damping gap 232g. The damping gap 232g is filled with an incompressible fluid to provide damping in a manner known in the art. As best shown in FIG. 10A, the damping gap 232g opens into a wider chamber at an orifice 232o formed at each circumferential end of the squeeze film damping gap 232g.

In accordance with the present invention, an adjustable post assembly 50, best shown in FIG. 10A, is associated with each structural spring (234 and 236). The adjustable post assembly 50 includes a spring contacting post 52 and a threaded adjustment assembly 54 for adjusting the gap between the post 52 and the structural beam 234 of the structural spring assembly 236.

The post 52 extends toward the beam 234, but is spaced therefrom by a predetermined gap. When the pad 232 is loaded and moves toward the base 220, the beam 234 deflects downward narrowing the gap between the beam 234 and the post 52. As long as there is a space between the post 52 and the beam 234, the beam 234 deflects downward at a first, lower, spring rate, because the beam 234 is relatively long. When the post 52 comes into contact with the beam 234, however, the spring rate becomes higher since the effective length of the beam 234 is substantially shortened.

Thus, movement of the pads 232 toward the base 220 occurs with two distinct spring rates. The first, lower, spring rate occurring during the initial displacement and being determined by the length and thickness of the beam 234. A second, higher, spring rate occurring after contact with the post 52 and being determined by the thickness of the beam 234 which is unchanged and the length thereof which is significantly shortened.

The higher spring rate is, therefore, dependent on the distance between the circumferential end and the point at which the post contacts the spring. This, in turn, depends on the location of the post with respect to the spring. Thus, the location of the post assembly with respect to the spring is selected to obtain the desired spring rate after the post contacts the spring.

The point at which the spring rate changes from the relatively low spring rate to the relatively high spring rate depends on the gap between the post 52 and the beam 234 prior to any displacement. Specifically, as the space becomes larger, a greater amount of deflection occurs before onset of the change in spring rate.

The post assembly 50 of the present invention includes a threaded adjustment assembly 54 which allows the post to be moved toward or away from the beam 234 within certain limits so as to cause the gap between the post 52 and the beam 234 to change. As a result, the point at which the transition between the low spring rate and the high spring rate occurs can be adjusted to suit any particular application.

FIG. 10B graphically illustrates various deflection characteristics which can be achieved using the construction of the present invention. In the graph displacement is shown as a function of force. Initial displacement occurs at a lower spring rate. At some point along the displacement axis, the higher spring rate takes effect and a greater force is required for displacement (i.e., the spring rate is increased).

FIG. 10B illustrates four possible arrangements. In each arrangement, the lower spring rate is identical and the higher spring rate is identical. The difference is the point at which the transition between the lower spring rate and the higher spring rate occurs. Since this point depends on the initial gap between the post 52 and the beam 234, spring characteristic SC1 represents a situation where the post is relatively close to the beam 234 whereas the lines indicating the spring characteristics SC2, SC3 and SC4 correspond to a progressively greater space between the post 52 and the beam 234. The final line SC4 corresponds to a relatively large gap between the post 52 and the post 234 such that a good deal of displacement occurs before the higher spring rate takes effect.

The higher spring rate has the same slope in each case because the circumferential point of contact of the post on the spring is unchanged. To obtain a different spring rate slope, this location must be changed.

Figure 11:
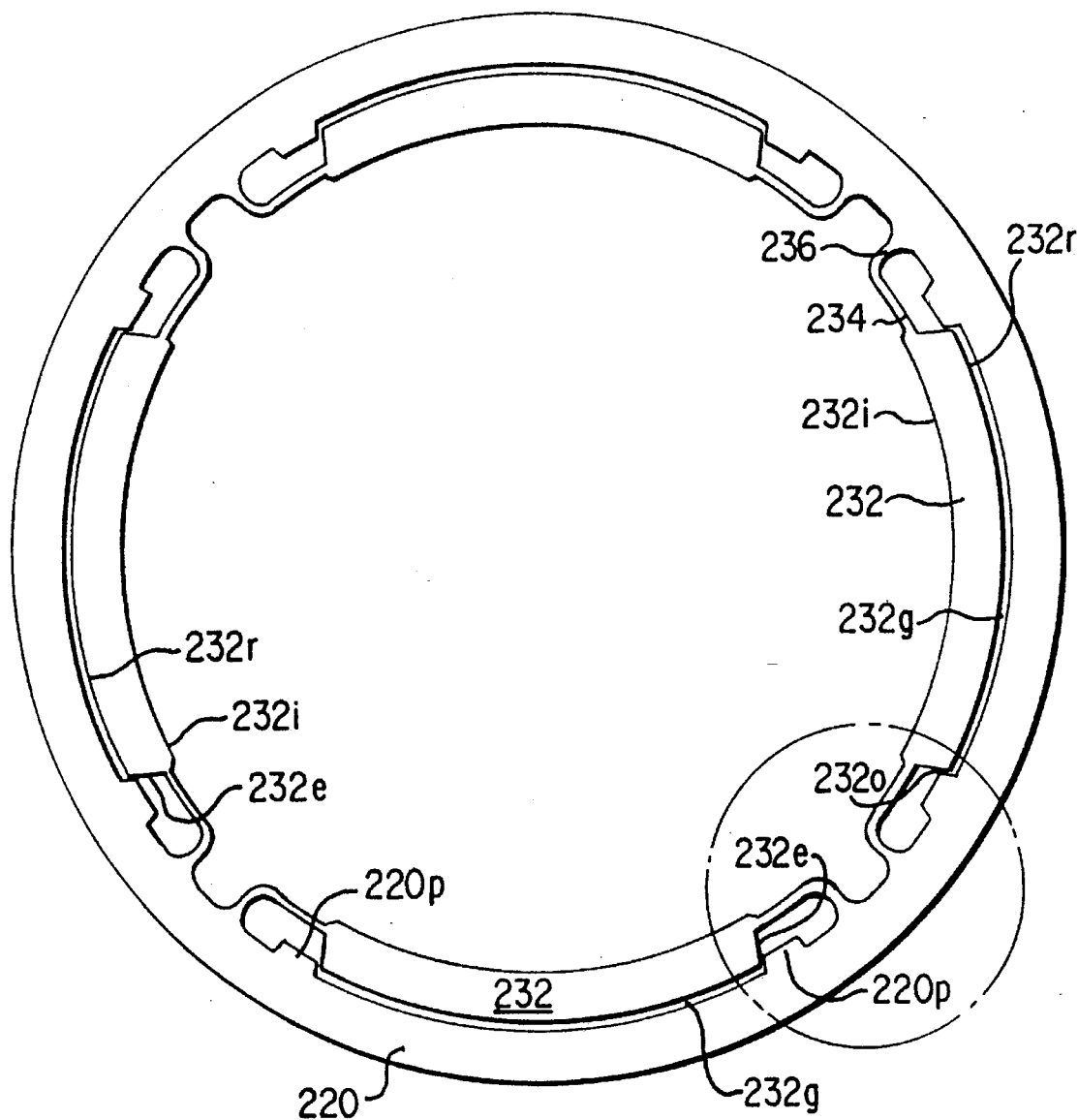
FIG. 11 is a sectional view of a damper structure with a variable orifice.

FIG. 11 shows a squeeze film damper construction similar to that shown in FIG. 10 in which the post assembly is not shown. The embodiment illustrated in FIG. 11 further differs from that shown in FIG. 10 in that protrusions 220p are formed on the radially inner surface of the base 220. These protrusions are formed so as to define an orifice 230o which controls the flow of fluid from the damping gap 232g into and out of the chamber. Any circumferential fluid flow passing between the damping gap 232g and the outer chamber must pass through this restriction.

Figure 11A:
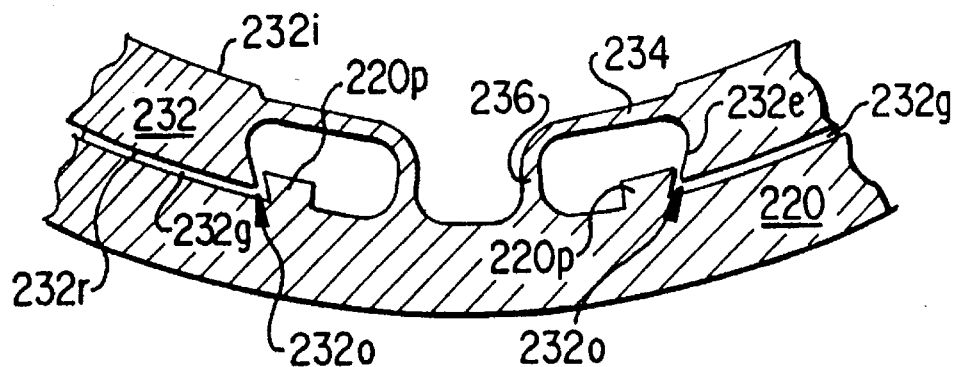
FIG. 11A is a detail view of another damper structure with a variable orifice.
Figure 11B:
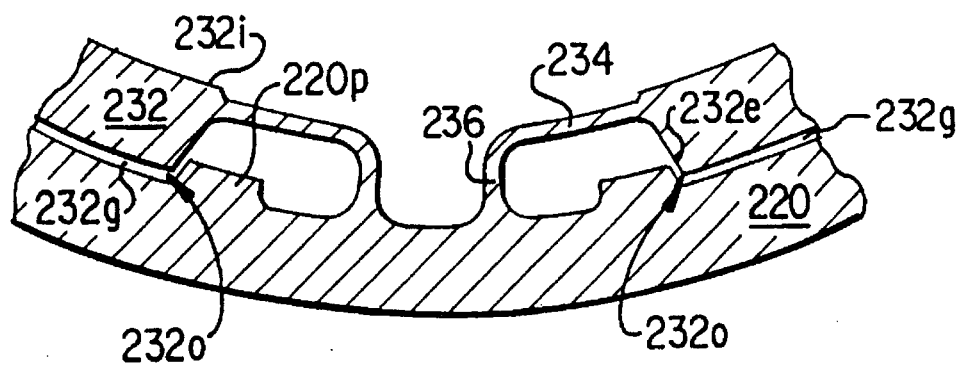
FIG. 11B is a detail view of another damper structure with a variable orifice.

The present inventors have discovered that, in certain instances, it is advantageous to vary the size of the orifice with displacement to thereby control flow into and out of the damping gap with displacement. FIGS. 11A and 11B show constructions which make such a variation possible. Specifically, the protrusion 232p and the circumferential end 232e of the pad 232 are configured such that the gap or orifice 232o either increases or decreases in size as the pad moves relative to the protrusion.

In FIG. 11A, the protrusion 232 is tapered toward the pad and the circumferential end of the pad 232 is tapered toward the protrusion such that both the protrusion and the end of the pad have edges which extend at an acute angle away from one another. Thus, the passage between the damping gap 232g and the chamber is acute and as the pad 232 moves radially outward, the gap or orifice increases with displacement.

FIG. 11B shows the opposite construction in which the protrusion 220p is tapered away from the circumferential end of the pad edge 232e and the pad edge 232e is likewise tapered away from the protrusion 220p so that the edges of the pad and protrusion are obtuse. Thus, the passage between the gap and the chamber is obtuse and the gap or orifice becomes smaller as the pad 232 moves radially toward the base 220.

Figure 11C:
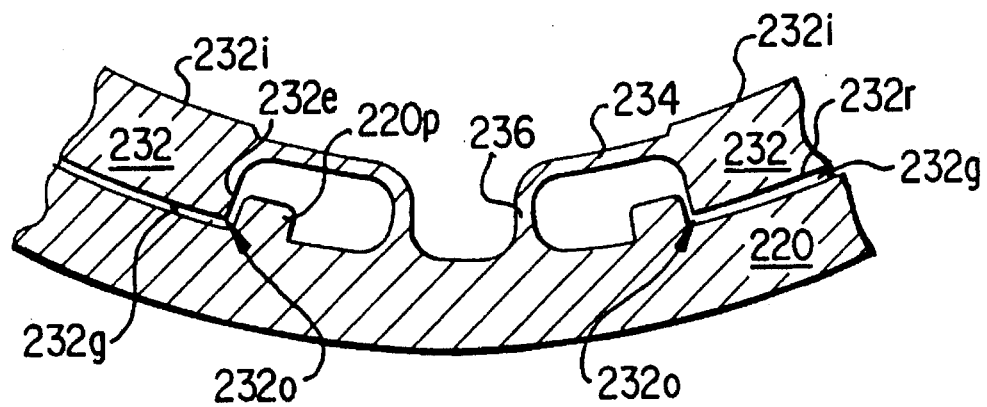
FIG. 11C is a detail view of a damper structure with a constant orifice.

FIG. 11C shows an arrangement in which the edge walls of the protrusion 220p and the circumferential ends of the pad 230 extend at right angles radially and parallel such that the size of the orifice remains constant with displacement.

Figure 12:
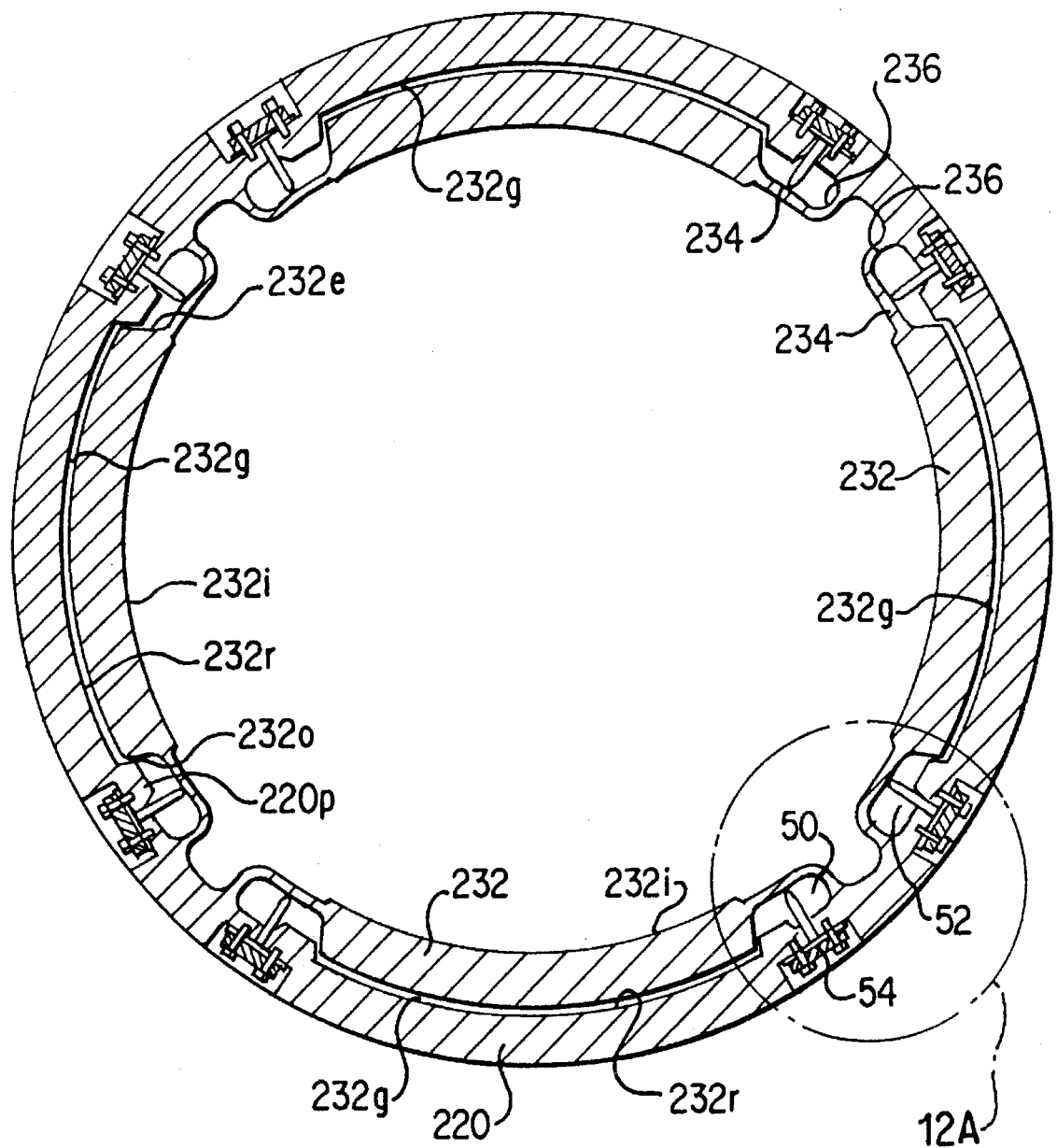
FIG. 12 is a sectional view of a damper structure having both adjustable stiffness and a variable orifice.
Figure 12A:
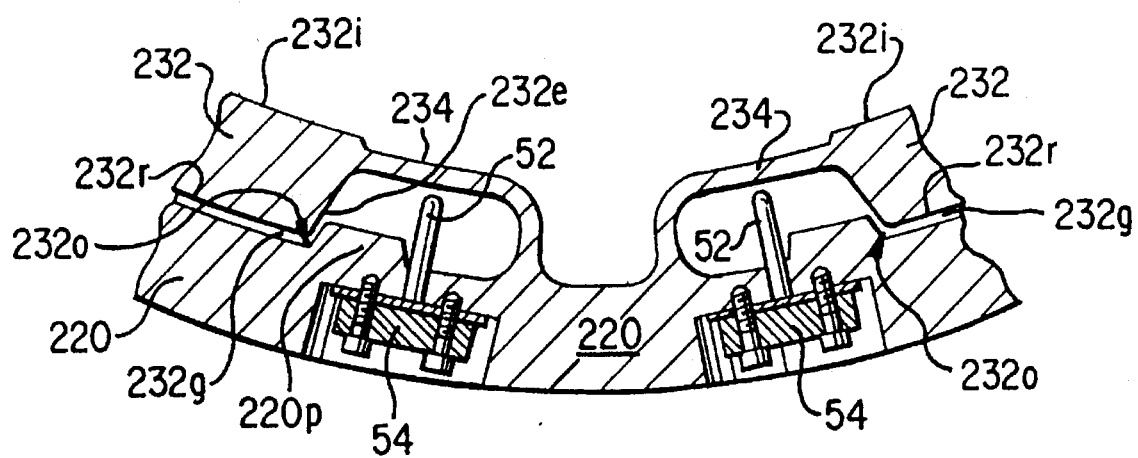
FIG. 12A is a detail view of the damper of FIG. 12.

FIGS. 12 and 12A show a squeeze film damper construction which includes both a variable orifice and an adjustable spring rate. The variable spring rate construction is identical to that shown in FIG. 11B and described above using the same reference numerals. The protrusion 220p is tapered away from the pad end 232e so that the orifice 232o becomes smaller as the pad 232 moves downward. The damper construction shown in FIGS. 12 and 12A also include an adjustable post assembly identical to that shown in FIGS. 10 and 10A and described above using the same reference numerals. Thus, the advantages of an adjustable stiffness characteristic and variable orifice size can be combined in a single damper.

One of the major attributes of the integral centering spring squeeze film damper concept is the fact that the deflection occurs at the ends, and the pad sector is relatively rigid which does not allow the squeeze film region to be affected by the uneven deflection experienced with a thin cantilevered section or simply support beam. The pad moves as a rigid body and the squeeze film zone is maximized for a given damper size. The restrictions at the ends prevent the circumferential pressure profile from reducing the effective damping in the squeeze film zone. In this capacity, it is not just a reservoir or an orifice restrictor.

The spring supports shown at the ends of each sector can be located anywhere along the length of the pad, and can be attached radially to the outer ring or housing and support the sector pad. The spring elements can therefore extend radially and circumferentially along the damper ring. This is shown schematically in FIGS. 13, 13A and 13B. The squeeze film damper construction shown is very similar to that depicted in FIGS. 11 and 11B. In the construction of FIGS. 13–13B, however, a preloaded spring assembly 221, 222 is provided in a bore proximate the mid section of each of the four damping sectors. The spring assembly shown includes a coil spring 221 and threaded spring support plug 222. One end of the spring 221 contacts the damper portion of the pad 232 and the other end is in contact with the support plug 222. The amount of preload on the spring can be adjusted by threading the plug 222 into and out of the bore as the case may be. The preloaded spring in the mid section of each sector can also be used to vary the stiffness at different radial displacements thus providing a variable stiffness curve.

Figure 14A:
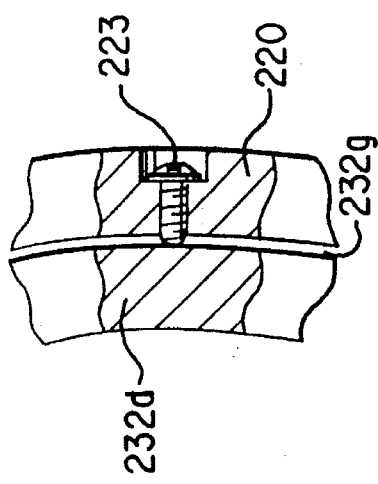
FIG. 14A is a detailed view of the damper structure of FIG. 14 along the lines indicated.
Figure 14B:
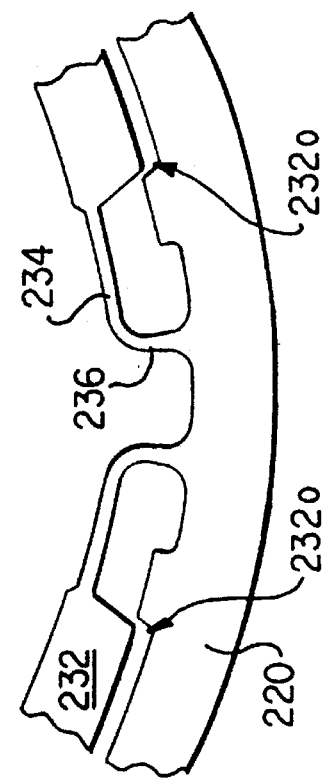
FIG. 14B is a detailed view of the damper structure shown in FIG. 14 as indicated.
Figure 14:
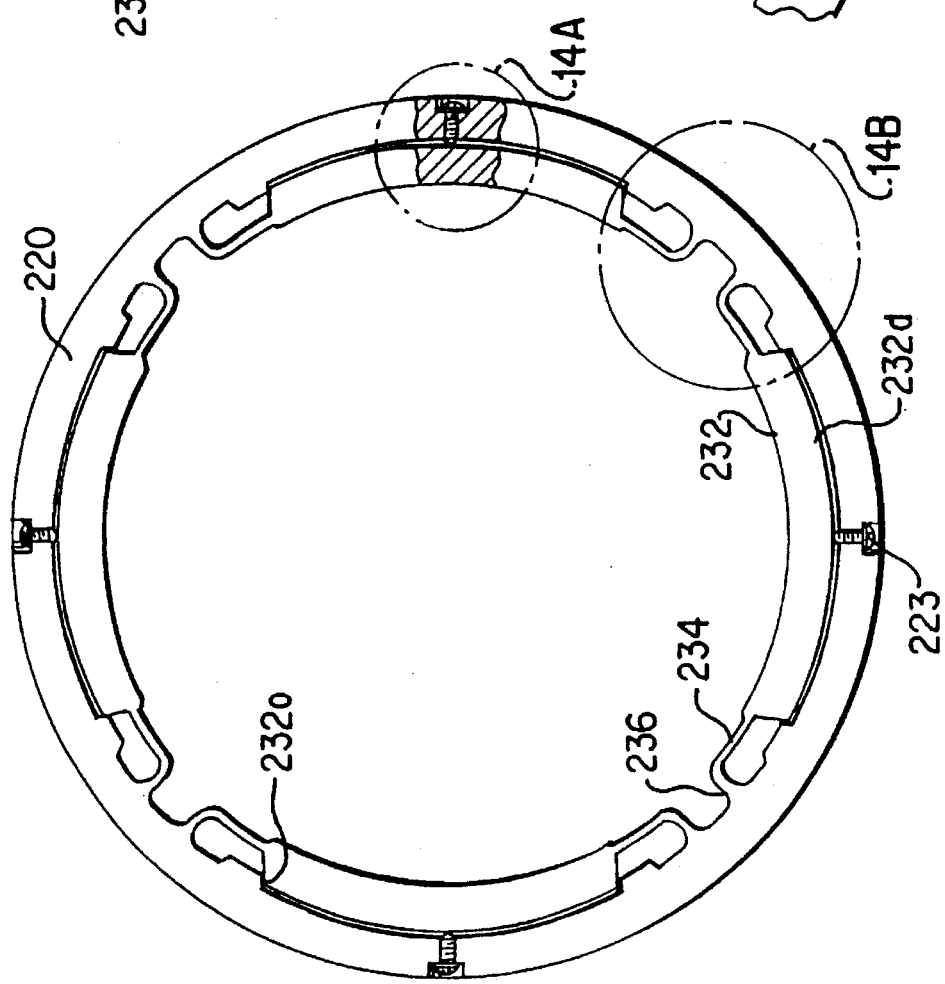
FIG. 14 is a sectional view of a damper structure in which an adjustable stop is used to limit the radial movement of the sector pads or beam sections.

FIGS. 14, 14A and 14B show how a stop can be used to limit the radial movement of the sector pads or beam sections. Again, the structure is similar to FIGS. 11 and 11B. In the construction of FIGS. 14–14B, however, threaded stops 223 are provided in the outer periphery portion 220 at a location proximate the circumferential midpoint of each damping sector. The threaded stops depicted are in the form of a threaded bolt extending radially through the outer periphery portion and having an end adapted to contact the damper portion of a respective pad portion 232. This allows control of the maximum amplitudes in the damper.

FIGS. 15 and 15A show how the squeeze film clearance can be varied within the same sector or beam section. The structure is similar to that of FIGS. 11 and 11B, but the radial dimension of the damping gap 232g increases in step-like fashion at the circumferential ends of each damping sector. As best shown in FIG. 15, this is achieved by forming a step at either end of the damper portion of each pad 232. Thus, the squeeze film clearance is smallest in the central region of each damping sector. This allows additional variation in the damper properties and can provide a limit stop for high vibration excursions.

Figure 16A:
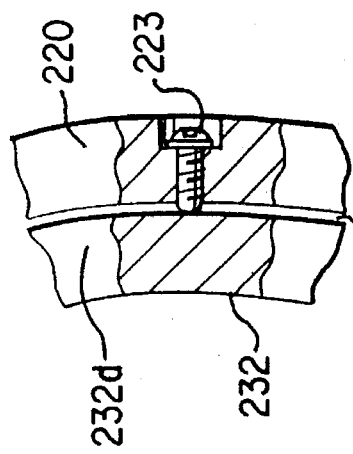
FIG. 16A is a detailed view of the damper structure of FIG. 16 along the lines indicated.
Figure 16B:
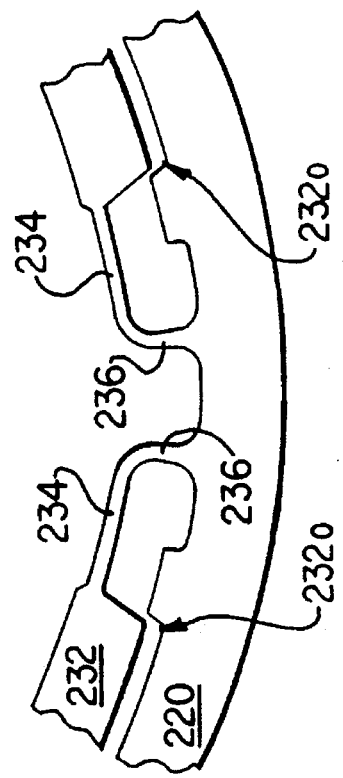
FIG. 16B is a detailed view of the damper structure of FIG. 16 along the lines indicated.
Figure 16:
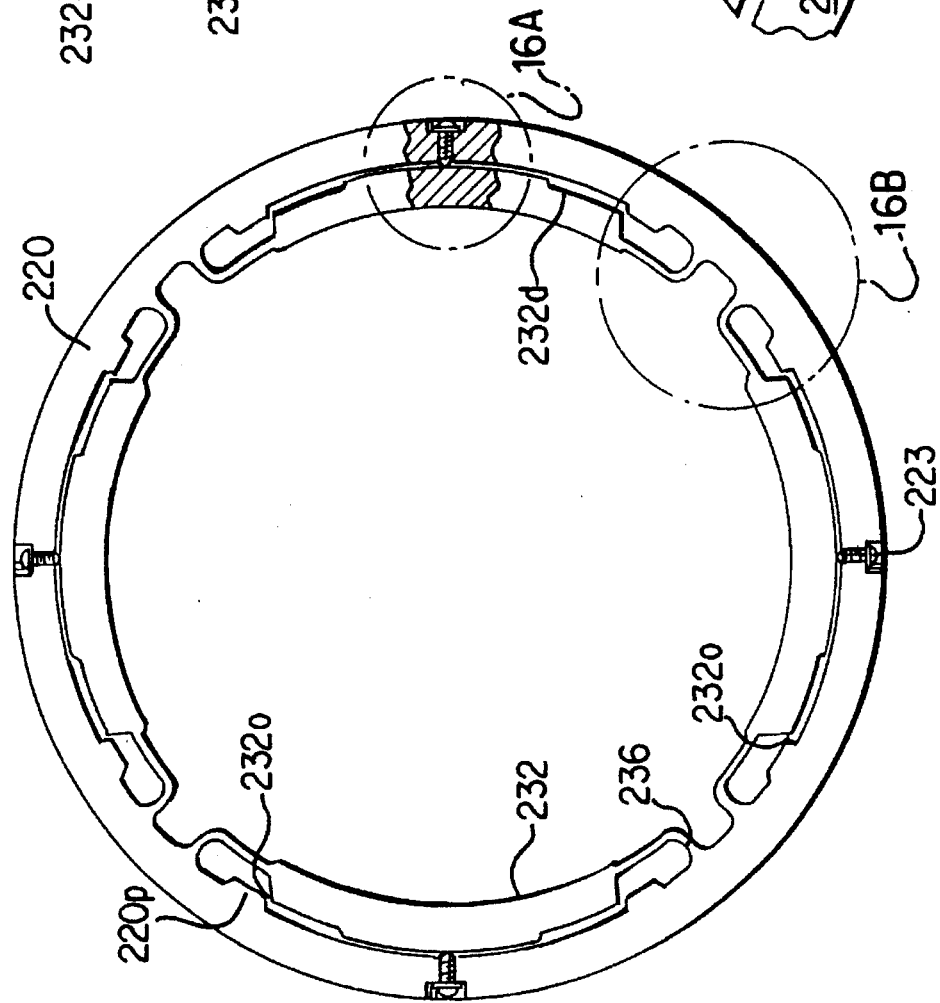
FIG. 16 is a sectional view of a damper structure using both a limit screw or stop and variable squeeze film clearance.

FIGS. 16, 16A and 16B show how a stepped squeeze film clearance can also be used in combination with a limit screw or stop to provide a wider performance map. The structure shown is similar to that of FIGS. 15 and 15A except that a threaded stop in the form of a limit screw or stop 223 is provided in each damping sector. The threaded stops are similar to those used in the embodiment of FIGS. 14–14B and like those stops, the stops are provided proximate the circumferential midpoint of each damping sector. In this way, the adjustability of the embodiment of FIGS. 14–14B can be combined with the squeeze film thickness variation of the embodiment of FIGS. 15–15A to achieve a wide variety of performance characteristics.

FIGS. 17 and 17A show how a lower stiffness can be provided with a rather long support beam or rib without reducing the effective squeeze damping zone. The structure shown is similar to that of FIGS. 9 and 9A except that the pads 232 and support beams 234 and 236 are configured such that the beam 234 is longer and thus relatively more flexible, i.e., less stiff. More specifically, the beam 234 is lengthened by extending a cut 234c into the pad 232. To ensure that the beam 234 does not contact the bearing, the beam 234 is slightly recessed from the innermost surface of the pads 232 as shown in both FIG. 17 and FIG. 17A. As is apparent from the drawings, the length of the effective damping zone is not reduced by the lengthening of the beam. Thus, lower stiffness is provided without reducing the effective squeeze damping Zone.

Figure 18A:
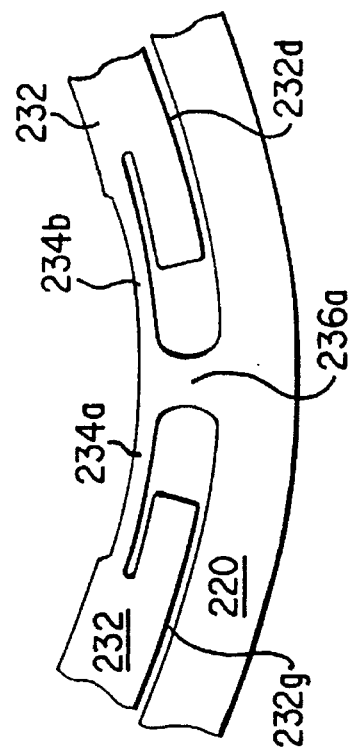
FIG. 18A is a detailed view of the damper structure of FIG. 18 along the lines indicated.
Figure 18:
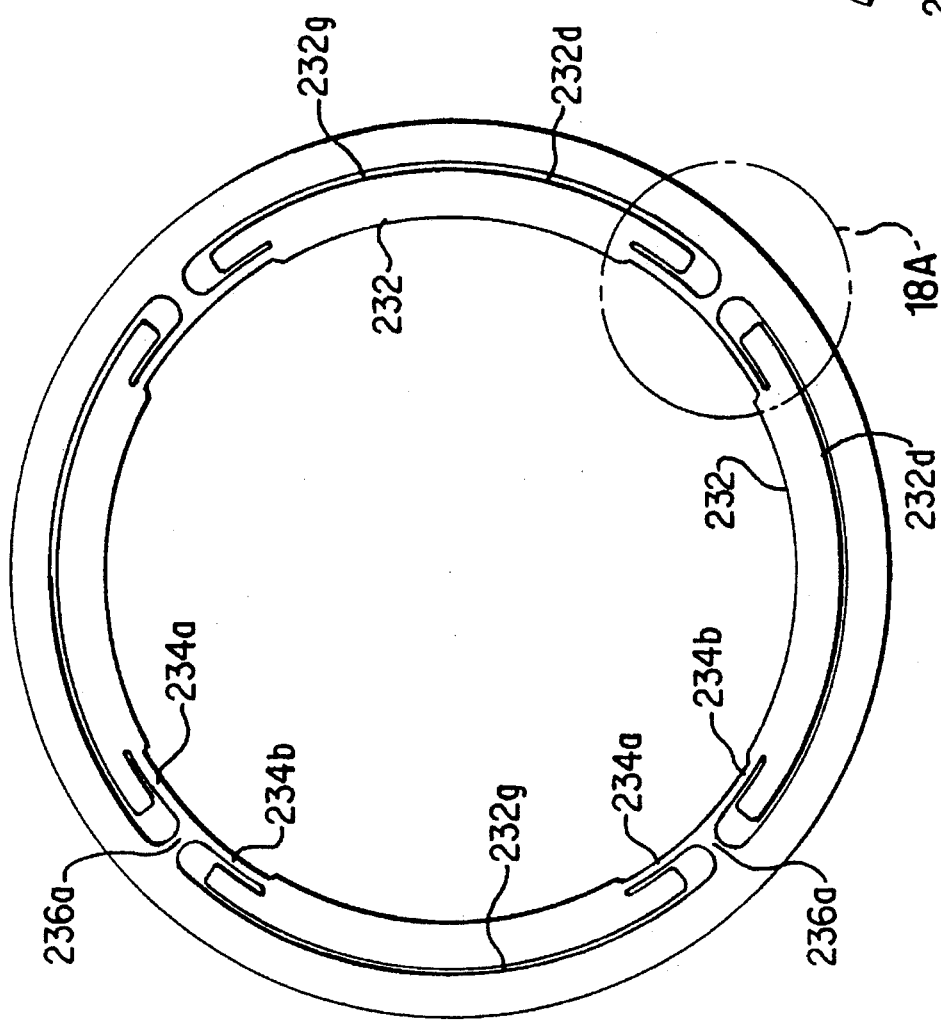
FIG. 18 is a sectional view of a damper in which the ribs are stretched instead of bent to reduce bending stresses and provide a higher stiffness.

FIGS. 18 and 18A show how the stretching of the beams or ribs instead of bending can be utilized to reduce the stresses and provide a higher stiffness for the same size damper. The overall structure shown is similar to that of FIGS. 17–17A except that the spring support, in the form of beams 234a, 234b and 236a is quite different. As shown in FIGS. 18 and 18A, the spring support comprises a single circumferential beam 234a, 234b stretching between adjacent pads 232. The beam is supported at its midpoint by a radial beam 236a to divide the circumferential beam into separate portions 234a and 234b. This type of support considerably reduces the flexibility of the support. In effect, the flexibility of the radial beam 236a is significantly limited because it is attached to beams 234*a* and 234*b* extending in opposite directions. This reduces stresses and provides much greater stiffness.

An important aspect of the present invention is the disclosure of machinable support shapes, i.e., support shapes which can be produced by machining a piece of heavy walled tubing or similar cylindrical journal using standardly available machining techniques. Such supports are characterized by the fact that they are formed from a piece of heavy walled tubing or similar cylindrical journal through the provision of bores, slits and grooves. The advantage of such supports is that it is easy to manufacture prototypes and to modify these prototypes after testing. Naturally, when the supports are to be mass produced, using, for example, molding or casting techniques, different manufacturing considerations may dictate different shapes. It is important to recognize that changes in shape affect support performance.

Another manufacturing consideration is ease of molding. Naturally, most of the support structures of the present invention are capable of being molded by some molding technique. Only certain shapes can, however, be injection molded in a simple two-piece mold, i.e., a mold which does not include cams. The supports of the present invention can be constructed with easily moldable shapes which are defined as shapes which can be injection molded using a simple two-piece mold. An easily moldable shape generally is characterized by the absence of "hidden" cavities which require cams for molding. Accordingly, an easily moldable shape includes no radially extending grooves in the inner and outer diameter and a continuous axial cross section.

The dimensions and deflection variables including number, size, shape, location and material characteristics of the elements defined in the unitary support structure can be tailored for any specific application to support a wide variety of loads. Of these variables, the shape of the support members is particularly important. The impact of shape of the support members on the deflection characteristics of the support structure can be appreciated when the variable formula for moment of inertia $bh^3/12$ (English units) (the main component of sectional modulus-for rectangular section, $z=I/c=bh^2/6$) is used as an example. Moreover, the ability of the support ring or pad to move with six degrees of freedom allows the support to compensate for and correct shaft misalignment. In this regard it is noted that the supports of the present invention have a self-correcting characteristic resulting from the tendency of the support to return to its non-deflected state due to the stiffness of the support. Of course, the stiffness of the support is primarily a function of the shape of the support structure, and to a lesser extent the other deflection variables, including number, size, location, and material characteristics of the elements defined by the grooves and cuts or slits formed in the unitary element. Stiffer supports have a greater self-correcting tendency but are less able to adjust for shaft misalignment.

In small quantities, the support structures disclosed herein are preferably constructed by electrical discharge machining or laser cutting methods. The double lines shown in the drawings are the actual paths of the wire or beam which is typically 0.002–0.060" (0.50–1.52 mm) in diameter. The lubricant that flows into the electrical discharge machined paths acts as a fluid dampener that reduces any vibration or instability at resonant frequencies. In the situations described above where a continuous cylindrical membrane is formed, the damping takes the form of a dash pot that exhibits high damping characteristics. With the novel approach of tuning or modifying the stiffness of the bearing configuration or structure and particularly the beam to suit a particular bearing application, optimum performance is readily obtained. Recent computer analysis has demonstrated that virtually any stiffness or deflection may be accomplished.

As noted above, when manufacturing low volumes or prototypes of the support structure of the present invention, the support structure are preferably constructed by electrical discharge machining or laser cutting methods. Such small volumes or prototypes are usually constructed of metal. However, when higher volume production of a particular bearing is contemplated, other methods of manufacture such as injection molding, casting, powdered metal die casting and extrusion are more economical. In connection with such manufacturing methods, it may be more economical to use plastics, ceramics, powdered metals or composites to form the support structure of the present invention. Methods such as injection molding, casting, powdered metal die casting with sintering and extrusion are sufficiently well known that the processes need not be detailed herein. Once a prototype bearing is constructed, the method of producing a mold or the like for mass production of the support structure is well known to those skilled in the molding and casting art. Moreover, it is to be understood that only certain types of the support structure of the present invention are adapted to be made in high volumes through extrusion. Generally, these are the support structures that are formed only through the provision of circumferential grooves and radial and circumferential cuts or slits which extend axially throughout the entire support structure, i.e., those support structure having a constant or otherwise extrudable cross-section.

Investment casting may be used in the manufacture of intermediate quantities, e.g., less than 5,000 support structures. The first step of the investment casting procedure is manufacture of a prototype. The prototype can be manufactured in any number of ways, but is preferably manufactured by machining a piece of heavy walled tubing or similar cylindrical journal. In larger support structures, the cylindrical journal typically is machined using a lathe for forming face and circumferential grooves, and a mill for forming axial and radial bores. In machining smaller cylindrical journals, techniques such as water-jet cutting, laser and wire electrical discharge techniques are generally more suitable. In either application, the journals are typically turned and milled to form the larger grooves.

After the prototype is formed, it may be desirable to test the prototype to confirm that the support structure functions in the predicted manner. As a result of such testing, it may be necessary to modify and refine the prototype to obtain the desired results.

Once a satisfactory prototype is obtained, a rubber mold of the prototype is formed. Typically, this step involves encasing the prototype in molten rubber and allowing the rubber to harden so as to form a rubber mold of the prototype. The rubber encasing the prototype is then split and the prototype is removed to yield an open rubber mold.

Once the rubber mold is obtained, it is used to form a wax casting. This step typically involves pouring molten wax into the rubber mold and allowing the wax to harden to form a wax casting of the support structure.

After the wax casting is obtained, it is used to form a plaster mold. This step typically involves encasing the wax casting and plaster, allowing the plaster to harden around the wax casting so as to form a plaster mold.

The plaster mold can then be used to form a support structure. Specifically, molten bearing material, such as bronze, is poured into the plaster mold so as to melt and displace the wax casting from the mold. Thus, the plaster mold is filled with molten material and the melted wax is removed from the plaster mold. After the molten material hardens, the plaster mold is removed from around the support structure.

As noted above, the first step in the investment casting method, indeed in any method, of producing support structures in accordance with the present invention is the production of a prototype bearing. The relatively complex support structures of the present invention can be formed using simple manufacturing techniques.

With the foregoing in mind, it is believed sufficient to describe the method of making a single support structure through the use of electrical discharge manufacturing and machining. A description of such manufacture demonstrates the ease with which the relatively complex support structure shapes of the present invention can be achieved.

Each support is initially in the form of a cylindrical blank having a cylindrical bore as shown in FIGS. 5A and 5B. The blank is then machined to provide a radial lubricating fluid groove as shown in FIGS. 6A and 6B. For certain applications, it is desirable to further machine the blank to include facing grooves which are preferably symmetrically disposed on the radial faces of the support structure as shown in FIGS. 7A and 7B. The provision of such facing grooves ultimately results in a support which is easily torsionally deflected. While the groove shown in FIGS. 7A and 7B are cylindrical, it is possible to provide tapered grooves as shown in FIGS. 8A and 8B. This yields a support structure which exhibits improved deflection characteristics by virtue of the angled alignment of the support beams if it is preferable that the support beams converge at a point proximate the center line of the shaft. This ensures that flexibility occurs about the shaft center line by establishing a center of action for the entire system such that the support may adjust to shaft misalignment. In essence, the tapering of the support beams causes the support to act in a manner similar to a spherical bearing by concentrating the support forces on a single point about which the shaft may pivot in all directions to correct any misalignment. The arrows in FIG. 8A illustrate the lines of action of the deflection.

After the cylindrical blank is properly machined as shown in FIGS. 6A and 6B, FIGS. 7A and 7B, or FIGS. 8A and 8B radial and/or circumferential slits or grooves are formed along the radial face of the machined blank to define the support ring or support pads, the beam supports and the housing. FIGS. 8C and 8D illustrate such grooves formed in the machined blank of FIGS. 8A and 8B.

When manufacturing low volumes of the support structures or prototypes of the support structures for use in the construction of a mold, the cuts or slits are preferably formed through electrical discharge manufacturing or through the use of a laser. The machining of the cylindrical blanks to achieve the configurations illustrated in FIGS. 6A and 6B, FIGS. 7A and 7B, FIGS. 8A and 8B or a similar shape can be done through conventional machine tools such as a lathe or the like.

The performance characteristics of the support structures of the present invention result from the relative shape, size, location and material characteristics of the support member defined by the bores and cuts or slits formed in the machined blank. These parameters are largely defined by the dimensions and location of the radial circumferential bores, cuts or slits formed in the support structure in conjunction with the shape of the machined blank in which the bores or slits are formed to yield the support structure.

While the construction of the support structures of the present invention is most easily understood by reference to the machining process, larger quantities are preferably manufactured through the investment casting method of the present invention, and even larger scale production of the support structures contemplated by the present invention could be more economically performed through injection molding, casting, powdered metal, die casting, extrusion or the like.

In extruding a large number of support structures from a pipe-like cylindrical blank, radial lubricating fluid grooves, as shown in FIGS. 6A and 6B can be provided along the length of the pipe-like cylindrical blank prior to extrusion. However, if facing grooves were desired in the support structure these can be individually defined after slicing the individual support structure from the extruded and machined blank. For this reason, extrusion might not be a preferred method of producing support structure which require facing grooves to enhance torsional flexibility.

Optimization of the support structure configuration for individual applications precludes high stresses and insures long life. The absence of moving parts eliminates pivot wear and durability concerns by eliminating the pivot pad contact stresses. Manufacturing tolerances are completely eliminated in all but the final support ring bore, thus simplifying the manufacturing process. EDM manufacturing is efficient and accurate for low volume applications, while high volume applications can be cast, molded, extruded or forged as discussed herein.

I claim:

1. A fluid dampened bearing assembly comprising:
a bearing portion for supporting a rotating shaft and a support structure for supporting the bearing portion of the bearing assembly, the support structure comprising a plurality of circumferentially spaced pads for supporting the bearing portion, each of the pads being concavely curved and supported by two structural springs, each of the structural springs comprising at least one integral beam that is integrally formed as a single piece with the pad that it supports.

2. The bearing of claim 1, wherein at least one integral beam twists in a torsional mode.

3. The bearing of claim 1, wherein at least one integral beam deflects in a bending mode.

4. The bearing of claim 1, wherein at least one integral beam twists in a torsional mode and deflects in a bending mode.

5. The bearing of claim 1, wherein the support structure includes: a primary support portion; a secondary support portion; and a tertiary support portion; the primary support portion being divided into a plurality of beams, the secondary support portion supporting each of said plurality of beams and the tertiary support portion supporting the secondary support portion; the unitary support structure designed such that there is a radial space between every point on the radially inner surface and the radially outer surface.

6. A bearing, the bearing comprising: a radially inner portion for supporting a rotating shaft and an outer portion;
a damper for supporting the outer portion, the damper comprising: a plurality of concavely curved support pads for supporting the outer portion, each of the support pads including a concavely curved radially inner surface supporting the outer portion, a radially outer surface and spaced circumferential ends; a structural spring supporting each of the circumferential ends of each bearing pad so as to allow at least radial movement of the pads, each of the structural springs having a predetermined spring constant.

7. The bearing of claim 6, further comprising means for adjusting the predetermined amount of deflection which occurs before the spring rate changes.

8. The bearing of claim 6, further comprising a continuous generally circular base supporting each of the structural springs, the base having a radially inner surface and a radially outer surface; the radially outer surface of each of the pads being spaced from the radially inner surface of the base so as to define a circumferentially extending gap, the gap being filled with an incompressible fluid so as to dampen movement of the pad with respect to the base; and further comprising an orifice at each of the circumferential ends of the gap to allow the incompressible fluid to flow into and out of the gap in response to movement of the pad relative to the base, the orifice being defined by a radially inward extending protrusion formed on the radially inner surface of the base, the size of orifice being determined by the space between the circumferential edge of the pad and the surface of the protrusion.

9. The bearing of claim 8, wherein the size of the orifice varies with deflection of the pad toward or away from the base.

10. The bearing of claim 9, wherein the radially inward extending projection is tapered away from the pad such that the orifice becomes smaller with pad displacement.

11. The bearing of claim 9, wherein the projection tapers toward the pad so that the orifice increases with pad displacement.

12. A fluid dampened bearing comprising a plurality of spaced bearing pads each of the bearing pads having a leading edge, a trailing edge and a concavely curved pad surface extending between the leading edge and the trailing edge; a radially extending web supporting each bearing pad, the radially extending web being spaced from the leading edge and the trailing edge such that there is an open space under the leading edge and the trailing edge to permit deflection of the pad; and a fluid damper supporting each of the webs so that the bearing pads are indirectly supported by the damper.

* * * * *